(12) United States Patent
Ogawa

(10) Patent No.: US 11,082,608 B2
(45) Date of Patent: Aug. 3, 2021

(54) ELECTRONIC APPARATUS, METHOD, AND STORAGE MEDIUM

(71) Applicant: CANON KABUSHIKI KAISHA, Tokyo (JP)

(72) Inventor: Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 16/019,112

(22) Filed: Jun. 26, 2018

(65) Prior Publication Data
US 2019/0014256 A1    Jan. 10, 2019

(30) Foreign Application Priority Data

Jul. 6, 2017  (JP) .............................. JP2017-132702

(51) Int. Cl.
*H04N 5/232* (2006.01)
*G01S 3/00* (2006.01)

(52) U.S. Cl.
CPC .......... *H04N 5/23216* (2013.01); *G01S 3/00* (2013.01); *H04N 5/23219* (2013.01); *H04N 5/23293* (2013.01); *H04N 5/232127* (2018.08); *H04N 5/232933* (2018.08)

(58) Field of Classification Search
CPC .......... H04N 5/23216; H04N 5/23293; H04N 5/232933; H04N 5/232939
See application file for complete search history.

(56) References Cited

U.S. PATENT DOCUMENTS

| 2008/0018775 | A1  | 1/2008  | Inukai |
|---|---|---|---|
| 2008/0122796 | A1* | 5/2008  | Jobs ..................... G06F 3/04886 345/173 |
| 2011/0128241 | A1* | 6/2011  | Kang ..................... G06F 3/0488 345/173 |
| 2011/0249165 | A1* | 10/2011 | Churei ............... H04N 5/23293 348/333.02 |
| 2012/0299814 | A1* | 11/2012 | Kwon ..................... G06F 21/53 345/156 |
| 2013/0155276 | A1* | 6/2013  | Ueda .................... H04N 5/2351 348/223.1 |
| 2014/0049677 | A1* | 2/2014  | Kawaguchi ........ H04N 5/23216 348/333.01 |

(Continued)

FOREIGN PATENT DOCUMENTS

| CN | 103583036 A  |   | 2/2014 |
|---|---|---|---|
| CN | 102457661 B  | * | 3/2015 |

(Continued)

*Primary Examiner* — Mainul Hasan
(74) *Attorney, Agent, or Firm* — Canon U.S.A., Inc. IP Division

(57) ABSTRACT

An electronic apparatus includes a control unit configured to perform control, while a specific screen on which a specific function can be set is displayed on a first display unit on which a touch operation can be performed, and, if a specific state regarding the specific function is set, to cancel the specific state in response to a touch operation within the first area on the display surface of the first display unit. In addition, the control unit is configured to perform control, while the specific screen is displayed on a second display unit, and, if the specific state is set, to cancel the specific state in response to a touch operation at any position within a second area that is larger than the first area on the display surface.

25 Claims, 15 Drawing Sheets

(56) References Cited

U.S. PATENT DOCUMENTS

| | | | | |
|---|---|---|---|---|
| 2014/0098273 A1* | 4/2014 | Ito | .................... | H04N 5/23216 |
| | | | | 348/333.03 |
| 2014/0184867 A1* | 7/2014 | Sudo | ............... | H04N 5/232935 |
| | | | | 348/333.01 |
| 2016/0018942 A1* | 1/2016 | Kang | .................... | G06F 3/0416 |
| | | | | 345/173 |
| 2016/0191819 A1* | 6/2016 | Sakai | .................... | H04N 5/272 |
| | | | | 348/333.12 |
| 2017/0019603 A1* | 1/2017 | Kim | ................. | H04N 5/23293 |
| 2019/0041726 A1* | 2/2019 | Nishimura | ............. | G03B 17/02 |

FOREIGN PATENT DOCUMENTS

| CN | 106817536 | A | | 6/2017 |
|---|---|---|---|---|
| CN | 106817537 | A | | 6/2017 |
| JP | 2004-165934 | A | | 6/2004 |
| JP | 2011022203 | A | | 2/2011 |
| JP | 2012089973 | A | * | 5/2012 |
| JP | 2013162419 | A | | 8/2013 |
| JP | 2017103566 | A | | 6/2017 |

\* cited by examiner

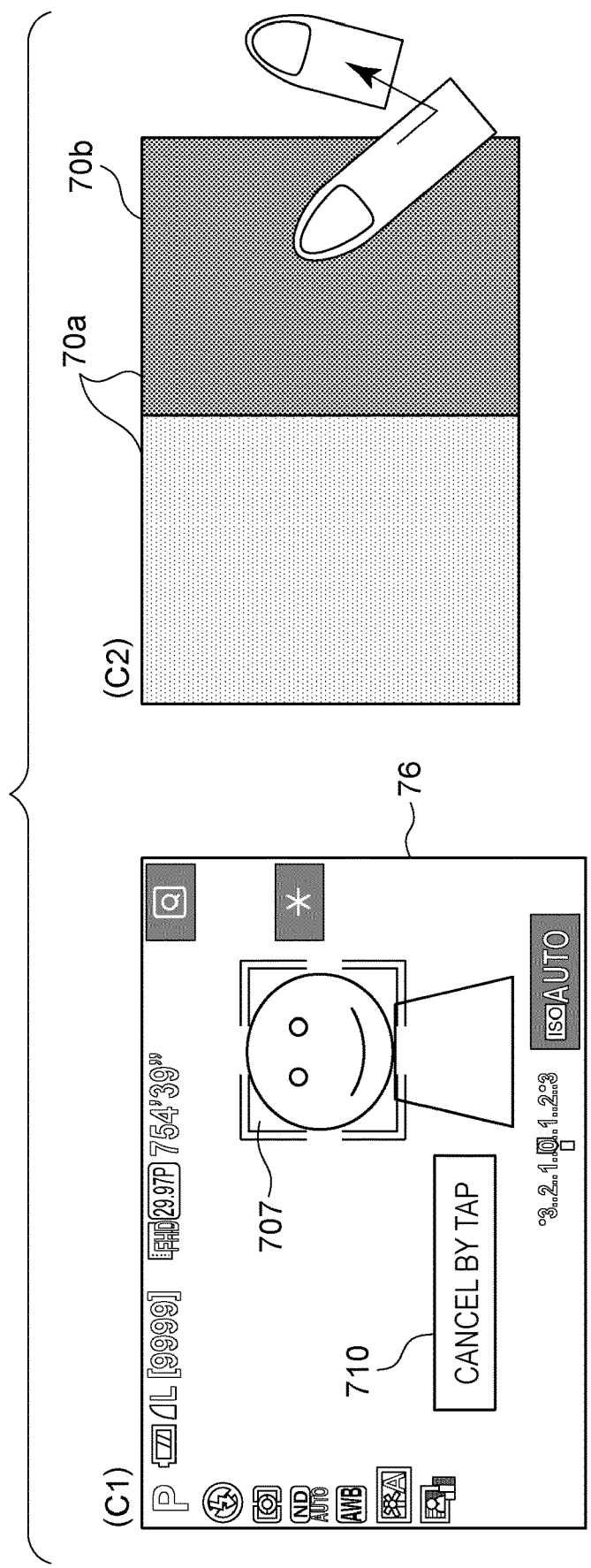

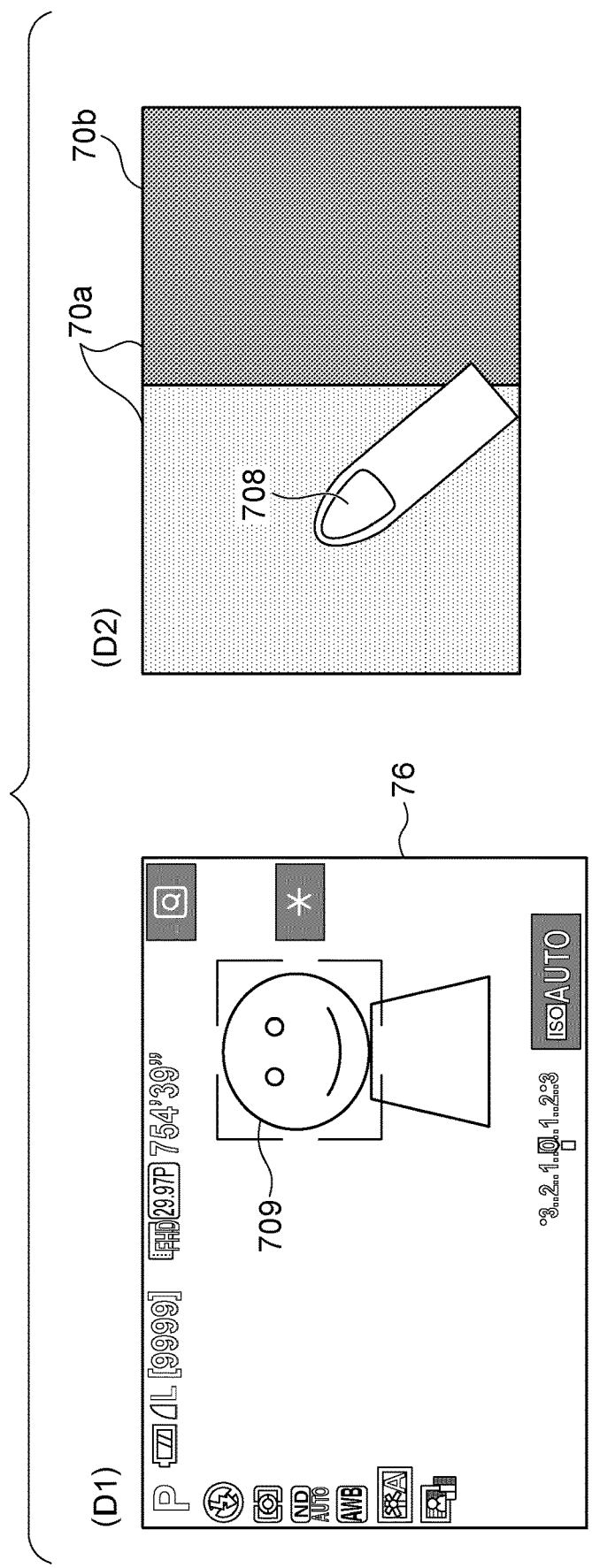

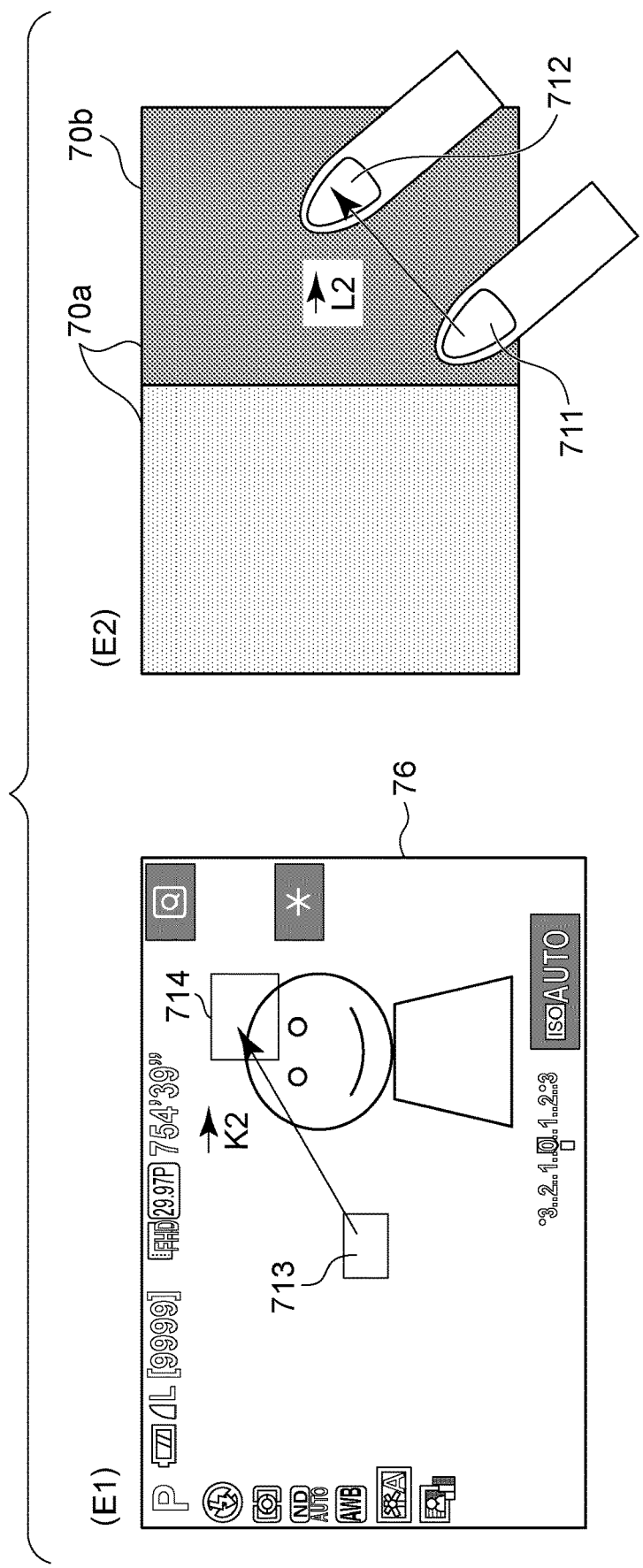

ELECTRONIC APPARATUS, METHOD, AND STORAGE MEDIUM

BACKGROUND

Field of the Disclosure

The present disclosure generally relates to electronics and, more particularly, to an electronic apparatus that enables an input operation on a detection surface that differs from a display device, a method for controlling the electronic apparatus, and a storage medium.

Description of the Related Art

In an apparatus in which a set value is changed by touching a portion on a display surface that is displayed on a touch panel surface, a method for changing the set value in another way while display is performed in a viewfinder is proposed. Japanese Patent Laid-Open No. 2004-165934 discloses a technique for changing the set value by performing a touch operation in a predetermined range on the touch panel in the horizontal or vertical direction and for switching between the next image capturing mode and the preceding image capturing mode by touching a portion displayed as "Next" or "Back" while display is performed in the viewfinder.

A user may wish to perform an operation for changing the set value or performing a specific function by performing a touch operation on the touch panel outside the viewfinder while looking into the viewfinder. However, with the method disclosed in Japanese Patent Laid-Open No. 2004-165934, in order to switch the image capturing mode to the next image capturing mode, the user has to touch the portion displayed as "Next" while looking into (using) the viewfinder. Thus, against the user's intention, it may be difficult to touch the portion displayed as "Next", or the portion displayed as "Back" may be touched unintentionally. In a case in which the display device and the operation-detection surface differ from each other as in the above case, it has been difficult to accurately and quickly touch an intended position. In addition, the position for performing a different function may be touched unintentionally. Thus, the operability may be decreased in some cases.

SUMMARY

The present disclosure provides an electronic apparatus that increases the operability for performing a function that is desired by a user in a case in which the display device and the operation-detection surface differ from each other.

According to one or more aspects of the present disclosure, an electronic apparatus includes a detecting unit configured to detect a touch operation on a display surface of a first display unit; a switch unit configured to switch between display on the first display unit and display on a second display unit; and one or more processors and one or more memories which function as a control unit configured to perform control, while a specific screen on which an operation for setting a specific function is receivable is displayed on the first display unit, to set a specific state regarding the specific function based on the touch operation on the display surface, and, if the specific state is set, based on whether the touch operation has been performed within a first area on the display surface, to cancel the specific state in response to the touch operation within the first area. In addition, the control unit is configured to perform control, while the specific screen is displayed on the second display unit, to set the specific state based on the touch operation on the display surface, and, if the specific state is set, regardless of whether the touch operation has been performed within the first area on the display surface, to cancel the specific state in response to the touch operation at any position within a second area that is larger than the first area.

Further features of the present disclosure will become apparent from the following description of exemplary embodiments with reference to the attached drawings.

BRIEF DESCRIPTION OF THE DRAWINGS

FIGS. 7A to 7E illustrate display examples on an in-viewfinder display unit and the states of touch operations on a touch panel in an embodiment.

DESCRIPTION OF THE EMBODIMENTS

Various exemplary embodiments, features, and aspects of the present disclosure will be described in detail below with reference to the accompanying drawings.

It is to be noted that the following exemplary embodiments are merely examples for implementing the present disclosure and can be appropriately modified or changed depending on individual constructions and various conditions of apparatuses to which the present disclosure is applied. Thus, the present disclosure is in no way limited to the following exemplary embodiments.

Figure 1A:
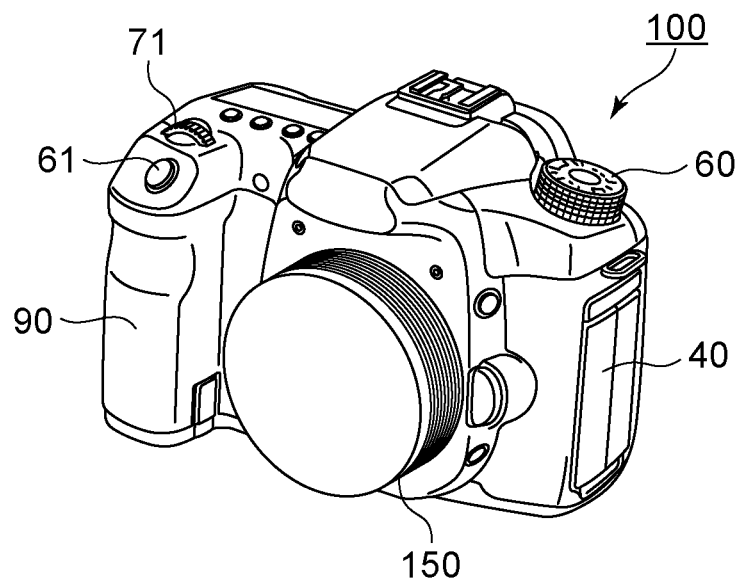
FIGS. 1A and 1B illustrate external appearances of a digital camera as an example of an apparatus to which the configuration of an embodiment is applicable.
Figure 1B:
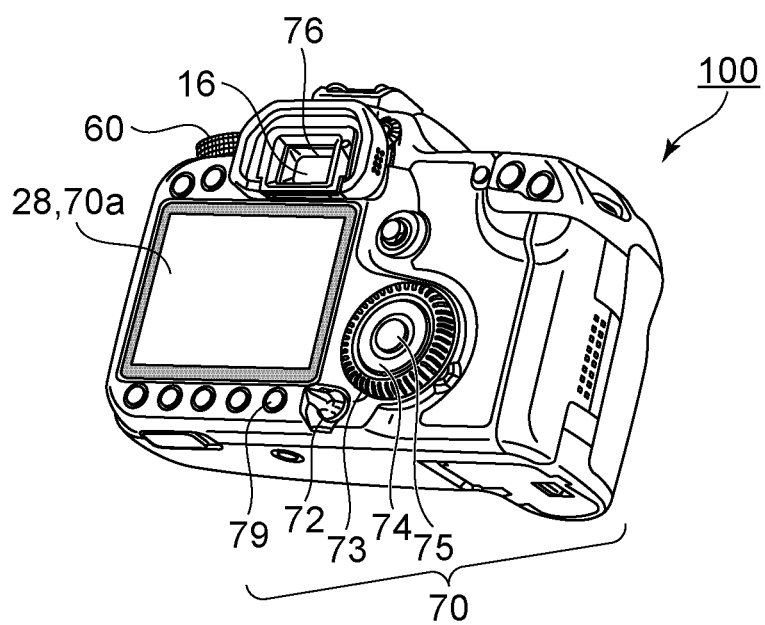

FIGS. 1A and 1B illustrate external appearances of a digital camera as an embodiment of an image capturing apparatus to which the present disclosure is applicable. FIG. 1A is a front perspective view of a digital camera 100, and FIG. 1B is a rear perspective view of the digital camera 100.

In FIGS. 1A and 1B, a display unit 28 is a display unit that displays images and various kinds of information. The display unit 28 is integrated with a touch panel 70a on which a touch operation can be performed. A shutter button 61 is an operation unit for inputting an instruction for image capturing. A mode switch 60 is an operation unit for switching between various modes. A lens unit 150 is a lens unit including lenses. A terminal cover 40 is a cover for protecting a connector (not shown) for a connection cable or the like for connecting the digital camera 100 and the connection cable of an external apparatus to each other.

A main electronic dial 71 is a rotary operation member. By rotating the main electronic dial 71, a set value such as a shutter speed or an aperture value can be changed, for example. A power switch 72 is an operation member for switching on and off the power of the digital camera 100. A sub-electronic dial 73 is a rotary operation member for moving a selection frame or viewing the next/preceding image, for example. A cross key 74 is a four-way key whose upper, lower, left, and right portions can be pressed in. Any operation corresponding to the pressed portion of the cross key 74 can be performed. A SET button 75 is a push button used mainly for confirming a selected item, for example. A playback button 79 is an operation button for switching between an image capturing mode and a playback mode. Upon the playback button 79 being pressed in the image capturing mode, the mode is switched to the playback mode, and the latest image among images stored in a recording medium 200 can be displayed on the display unit 28. The shutter button 61, the main electronic dial 71, the power switch 72, the sub-electronic dial 73, the cross key 74, the SET button 75, and the playback button 79 are included in an operation unit 70.

A viewfinder 16 is a look-into-type viewfinder. A user observes an in-viewfinder display unit 76, which is an electronic viewfinder in the viewfinder 16, to check a live view image. Note that the in-viewfinder display unit 76 may be an optical viewfinder instead of an electronic viewfinder. In this case, an optical image of a subject can be viewed through the viewfinder 16, and the in-viewfinder display unit 76 displays an autofocus (AF) frame and image capturing information.

A grip unit 90 is a holding unit that is shaped such that a user can easily grip the digital camera 100 with the right hand.

Figure 2:
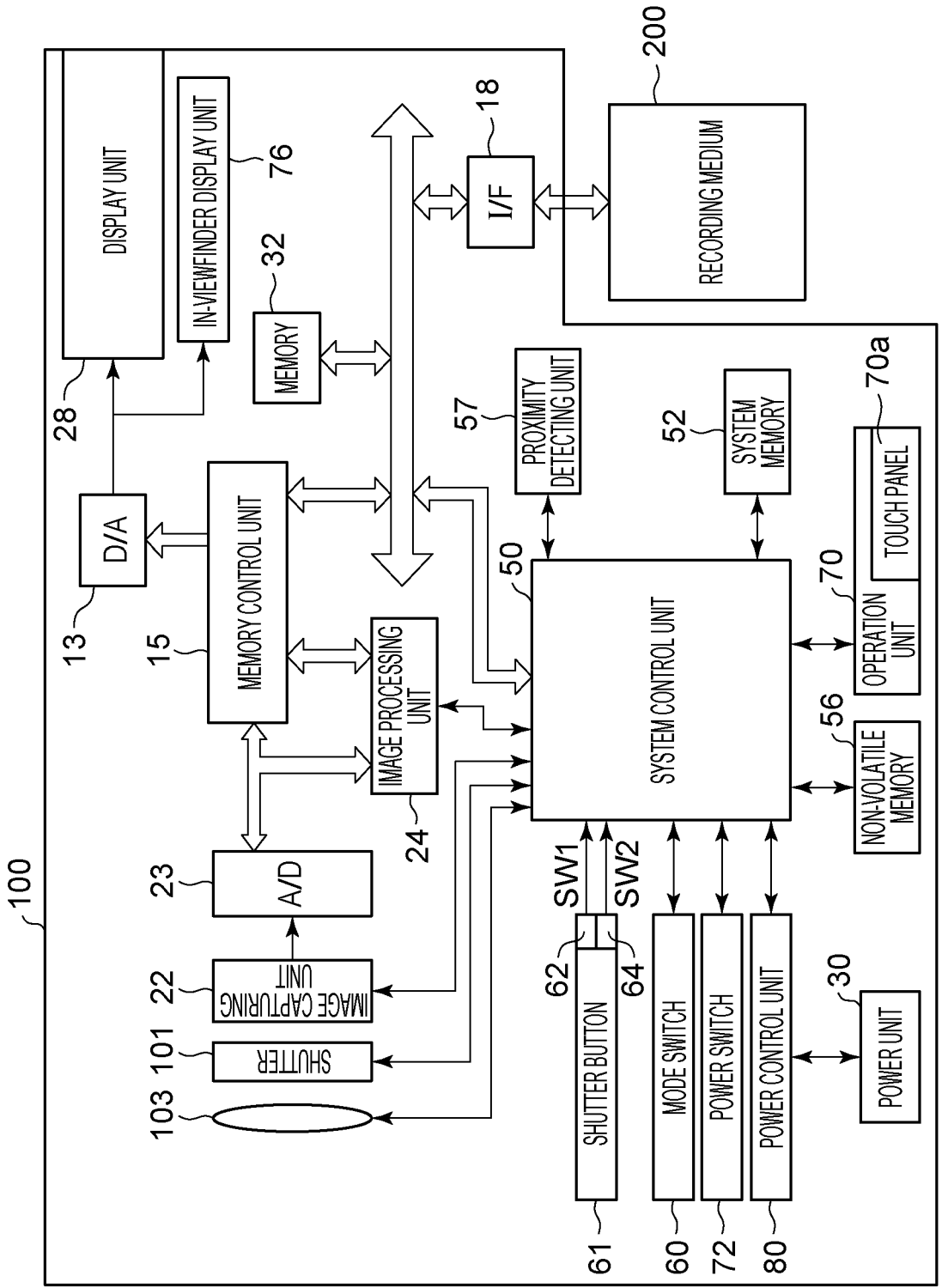
FIG. 2 is a block diagram illustrating a configuration example of the digital camera as an example of an apparatus to which the configuration of an embodiment is applicable.

FIG. 2 is a block diagram illustrating a configuration example of the digital camera 100 according to the present embodiment. In FIG. 2, an image capturing lens 103 is a lens group including a zoom lens and a focus lens. A shutter 101 is a shutter having a diaphragm function. An image capturing unit 22 is an image capturing element including a charge-coupled device (CCD), a complementary metal oxide semiconductor (CMOS) element, and the like for converting an optical image into an electric signal. An analog-to-digital (A/D) converter 23 is used for converting an analog signal that is output from the image capturing unit 22 into a digital signal.

An image processing unit 24 performs predetermined pixel interpolation, resizing processing such as reduction, and color converting processing on data from the A/D converter 23 or data from a memory control unit 15. In addition, the image processing unit 24 performs predetermined calculation processing by using image data obtained through image capturing, and on the basis of the calculation result, a system control unit 50 performs exposure control and ranging control. Thus, through-the-lens (TTL) AF processing, automatic exposure (AE) processing, or flash preliminary emission (EF) processing is performed. The image processing unit 24 further performs predetermined calculation processing by using image data obtained through image capturing, and on the basis of the calculation result, the image processing unit 24 also performs TTL auto white balance (AWB) processing.

Output data from the A/D converter 23 is directly written into a memory 32 through and the memory control unit 15 and/or the image processing unit 24. The memory 32 stores image data that is obtained by the image capturing unit 22 and converted into digital data by the A/D converter 23 and image data to be displayed on the display unit 28. The memory 32 has a storage capacity that is large enough to store a predetermined number of still images and a predetermined length of a moving image and sound data. In addition, the memory 32 also serves as a memory for image display (video memory).

A digital-to-analog (D/A) converter 13 converts display image data stored in the memory 32 into an analog signal and supplies the analog signal to the display unit 28. Thus, the display image data written into the memory 32 is transmitted through the D/A converter 13 and displayed on the display unit 28 or the in-viewfinder display unit 76. The display unit 28 or the in-viewfinder display unit 76 displays images and various kinds of information on a display such as a liquid crystal display (LCD) in accordance with the analog signal from the D/A converter 13. A digital signal that is subjected to A/D conversion performed by the A/D converter 23 and stored in the memory 32 is converted into an analog signal by the D/A converter 13, and the analog signal is sequentially transferred to the display unit 28 and displayed. Thus, the function of an electronic viewfinder is performed, and through-image display (live view image display) can be performed.

A non-volatile memory 56 is a recording medium such as an electrically erasable, programmable read-only memory (EEPROM), and data can be electrically erased, recorded, and read by the system control unit 50. The non-volatile memory 56 stores a constant, a program, and the like for the operation of the system control unit 50. The program herein refers to a computer program for executing any of the various flowcharts described later in the embodiments.

The system control unit 50, which may include one or more processors and one or more memories, may control the entire digital camera 100. Upon the above-described program recorded on the non-volatile memory 56 being executed, each processing described later in the embodiments may be performed.

As a system memory 52, a random access memory (RAM) may be used. The system memory 52 loads the constant and variable for the operation of the system control unit 50, the program read from the non-volatile memory 56, and the like. In addition, the system control unit 50 may perform display control by controlling the memory 32, the D/A converter 13, the display unit 28, and the like.

The mode switch 60, the shutter button 61, and the operation unit 70 are operation units for inputting various operation instructions into the system control unit 50.

A proximity detecting unit 57 is a proximity sensor that can detect the proximity of an object to the viewfinder 16. If the proximity detecting unit 57 detects the proximity of an object to the viewfinder 16, the display device is switched from the display unit 28 outside the viewfinder 16 to the in-viewfinder display unit 76, and thereby a user can check a live view image while looking into the viewfinder 16. Note that the display device may be switched not only by the proximity detecting unit 57 but also by performing a button operation.

A first shutter switch 62 is turned on by incompletely pressing the shutter button 61 provided on the digital camera 100, a so-called half press (instruction for image capturing preparation), and generates a first shutter switch signal SW1. With the first shutter switch signal SW1, an operation such as AF processing, AE processing, AWB processing, or EF processing is started. A second shutter switch 64 is turned on by completely pressing the shutter button 61, a so-called full press (instruction for image capturing), and generates a second shutter switch signal SW2. With the second shutter switch signal SW2, the system control unit 50 starts a still-image capturing operation performed by the image capturing unit 22, an image capturing process from reading of a signal from the image capturing unit 22 to writing of image data into the recording medium 200.

By performing a selection operation of various function icons displayed on the display unit 28, for example, functions are assigned to the respective operation members of the operation unit 70, as appropriate, for each scene, and the operation members function as various function buttons. Examples of the function buttons include an end button, a back button, a next/preceding image viewing button, a jump button, a narrowing-down button, an attribute changing button, and the like. For example, when a menu button is pressed, a menu screen on which various settings can be provided is displayed on the display unit 28. By using the menu screen, the four-way (upper, lower, left, and right) button, and the SET button displayed on the display unit 28, a user can intuitively provide various settings. The operation unit 70 includes the touch panel 70a, and a touch operation on an item or a live view image displayed on the display unit 28 allows a selection of a function assigned to the corresponding item or a predetermined position on the live view image.

A power control unit 80 includes a battery detection circuit, a direct-current (DC)-DC converter, a switching circuit that switches blocks to be electrically connected, and the like and detects whether a battery is mounted, the type of the battery, and the remaining amount of the battery. In addition, on the basis of the detection result and an instruction from the system control unit 50, the power control unit 80 controls the DC-DC converter and supplies a voltage to units including the recording medium 200 for a period of time. The power switch 72 is a switch by which the power of the digital camera 100 can be switched on and off.

A power unit 30 includes a primary battery such as an alkaline battery or a lithium battery, a secondary battery such as a NiCd battery, a NiMH battery, or a Li battery, an AC adapter, or the like.

A recording medium interface (I/F) 18 is an interface for the recording medium 200 such as a memory card or a hard disk. The recording medium 200 is a non-volatile recording medium such as a memory card for recording an image at the time of image capturing and is configured from a semiconductor memory, an optical disk, a magnetic disk, or the like.

With the above-described digital camera 100, image capturing using center point AF or face AF is possible. Center point AF is to automatically focus on a single center point on an image capturing screen. The face AF is to automatically focus on a face on an image capturing screen detected by a face detection function.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Now, the face detection function will be described. The system control unit 50 transmits image data as a face detection target to the image processing unit 24. Under the control of the system control unit 50, the image processing unit 24 causes the image data to pass through a horizontal band-pass filter. In addition, under the control of the system control unit 50, the image processing unit 24 causes the processed image data to further pass through a vertical band-pass filter. With these horizontal and vertical band-pass filters, edge components are detected from the image data. Then, the system control unit 50 performs pattern matching on the detected edge components, and extracts candidate groups of eyes, nose, mouth, and ear. Then, from the extracted candidate group of eyes, the system control unit 50 narrows down a pair of eyes as candidate eyes by determining the pair of eyes that satisfy conditions (e.g., length between two eyes, inclination thereof, and the like) that are set in advance. Then, the system control unit 50 associates the narrowed down candidate eyes with other parts (nose, mouth, ear) of the corresponding face and applies a non-face condition filter that is set in advance, thereby detecting a face. In accordance with the detection result of the face, the system control unit 50 outputs the face information and ends processing. At this time, feature quantities such as the number of faces are stored in the system memory 52.

Through the above image analysis of image data that is displayed as a live view image or a playback image, the feature quantity of the image data can be extracted, and subject information can be detected. Although the face information is taken as an example as the subject information in the present embodiment, the subject information may alternatively be any of other various kinds of information such as red-eye determination, eye detection, eye closure detection, and smile detection.

Note that face AE, face FE, or face WB may be performed simultaneously with the face AF. The face AE is processing for optimizing the exposure of the entire screen in accordance with the brightness of the detected face. The face FE is processing for adjusting the flash mainly on the detected face. The face WB is processing for optimizing the WB of the entire screen in accordance with the color of the detected face.

Note that the operation unit 70 includes the touch panel 70a (detection surface) on which a touch on the display unit 28 can be detected. The touch panel 70a and the display unit 28 may be integrated with each other. For example, the touch panel 70a is configured in such a manner that the light transmittance does not hinder the display of the display unit 28, and is mounted onto the top layer of a display surface of the display unit 28. Then, the input coordinates on the touch panel are associated with the display coordinates of the display unit 28. Thus, it is possible to configure a graphical user interface (GUI) as if a user can directly operate the screen displayed on the display unit 28. The system control unit 50 can detect the following operations on the touch panel 70a or the following states of the touch panel 70a (can detect an input operation).

Operation of newly touching the touch panel with a finger or a pen that has not touched the touch panel, that is, the start of touch (hereinafter referred to as Touch-Down).

State in which a finger or a pen touches the touch panel (hereinafter referred to as Touch-On).

Operation of moving a finger or a pen on the touch panel with the finger or the pen touched (hereinafter referred to as Touch-Move).

Operation of releasing a finger or a pen from the touch panel, that is, the end of touch (hereinafter referred to as Touch-Up).

State in which nothing touches the touch panel (hereinafter referred to as Touch-Off).

In response to detection of Touch-Down, Touch-On is simultaneously detected. After Touch-Down, unless Touch-Up is detected, Touch-On is continuously detected in a normal case. While Touch-Move is detected, Touch-On is also detected. Even if Touch-On is detected, unless the touch position moves, Touch-Move is not detected. After detection of Touch-Up of all fingers or pens that have touched, Touch-Off is detected.

The above operations or states and the coordinates of the position at which a finger or a pen touches the touch panel are transmitted to the system control unit 50 via an internal bus, and on the basis of the transmitted information, the system control unit 50 determines what kind of operation has been performed on the touch panel. As for Touch-Move, on the basis of a change in coordinates of the position, the movement direction of a finger or a pen that moves on the touch panel can be determined for each vertical or horizontal component on the touch panel. In addition, a process starting from Touch-Down on the touch panel and ending with Touch-Up after constant Touch-Move is regarded as drawing a stroke. A quick drawing of a stroke is called a flick. The flick is an operation in which a finger touching the touch panel moves quickly for a certain length and is released, and in other words, is a quick tracing operation with a flick of a finger at the touch panel. When Touch-Move for a predetermined length or more at a predetermined speed or higher is detected and then Touch-Up is detected, it can be determined that a flick is performed. In addition, in a case in which Touch-Move for the predetermined length or more at a speed lower than the predetermined speed is detected, it is determined that dragging is performed. The touch panel may be any type of various touch panels such as a resistive touch panel, a capacitive touch panel, a surface acoustic wave touch panel, an infrared touch panel, an electromagnetic induction touch panel, an image recognition touch panel, an optical sensor touch panel, and the like. Depending on the type, the touch panel may detect a touch by a touch on the touch panel or may detect a touch by an approach, with no touch, of a finger or a pen to the touch panel. Any type of touch panel may be used.

In the present embodiment, while a live view image is displayed on the display unit 28 and while a live view image is displayed on the in-viewfinder display unit 76 in the viewfinder, an operation for changing the AF position by operating the touch panel 70a on the rear surface can be received. While a live view image is displayed on the display unit 28, an AF frame is displayed on a touch position. On the other hand, while a live view image is displayed on the in-viewfinder display unit 76, the display device and the operation surface differ from each other, and accordingly, the AF frame is moved in accordance with movement of the touch position.

Note that the AF method may be phase detection AF or contrast AF. In addition, in phase detection AF, a defocus amount detected on an image capturing surface of the image capturing unit 22 may be used (image capturing surface phase detection AF) without using a focus detecting unit 11.

The AF method includes single point AF and face+tracking AF (tracking setting). In single point AF, AF processing is performed on a single point that is determined in advance or that is selected by a user. In face+tracking AF, a face is searched for within an image capturing range, and AF processing is performed on the found face. If a user selects a face as a tracking target, the selected face is tracked as an AF target even when the face moves. In face+tracking AF, a subject other than a face can also be selected. In face+tracking AF, once a tracking target has been selected, the target subject is continuously tracked until a user performs a cancel operation or the target subject moves out of the image capturing range. When a cancel operation is performed, the detected face is subjected to AF processing; however, if a face has not been detected, a specific subject is not tracked, but AF processing is performed at the center position of the image capturing range. As for the timing for performing AF processing, while Continuous (Conti) AF is in on state, AF processing is continuously performed at the position where the AF frame (tracking frame) is displayed. While Continuous AF is in off state, AF processing is performed at the position where the AF frame is displayed in accordance with an instruction for image capturing preparation.

Figure 3A:
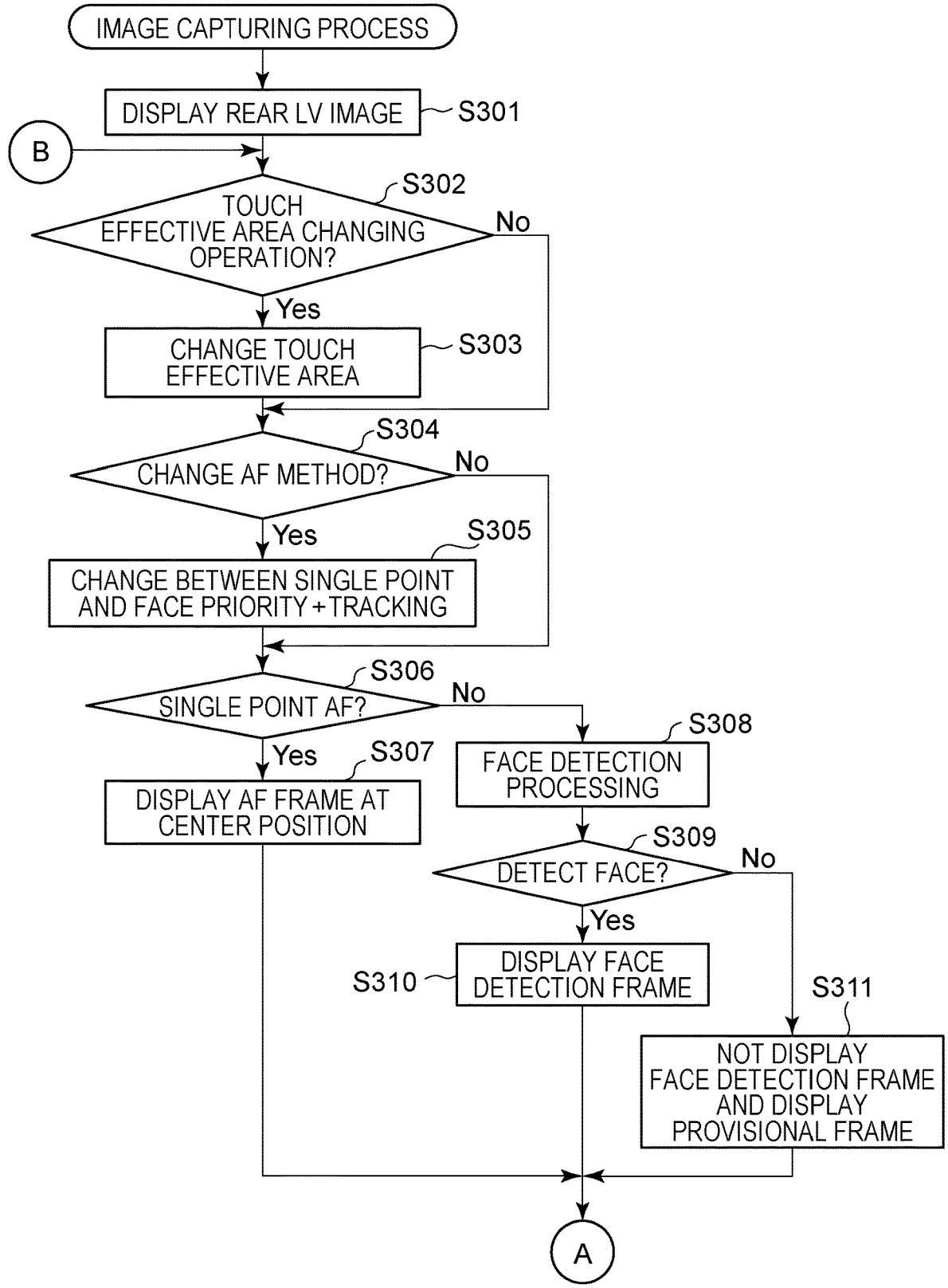
FIGS. 3A and 3B are flowcharts illustrating an image capturing process in an embodiment.
Figure 3B:
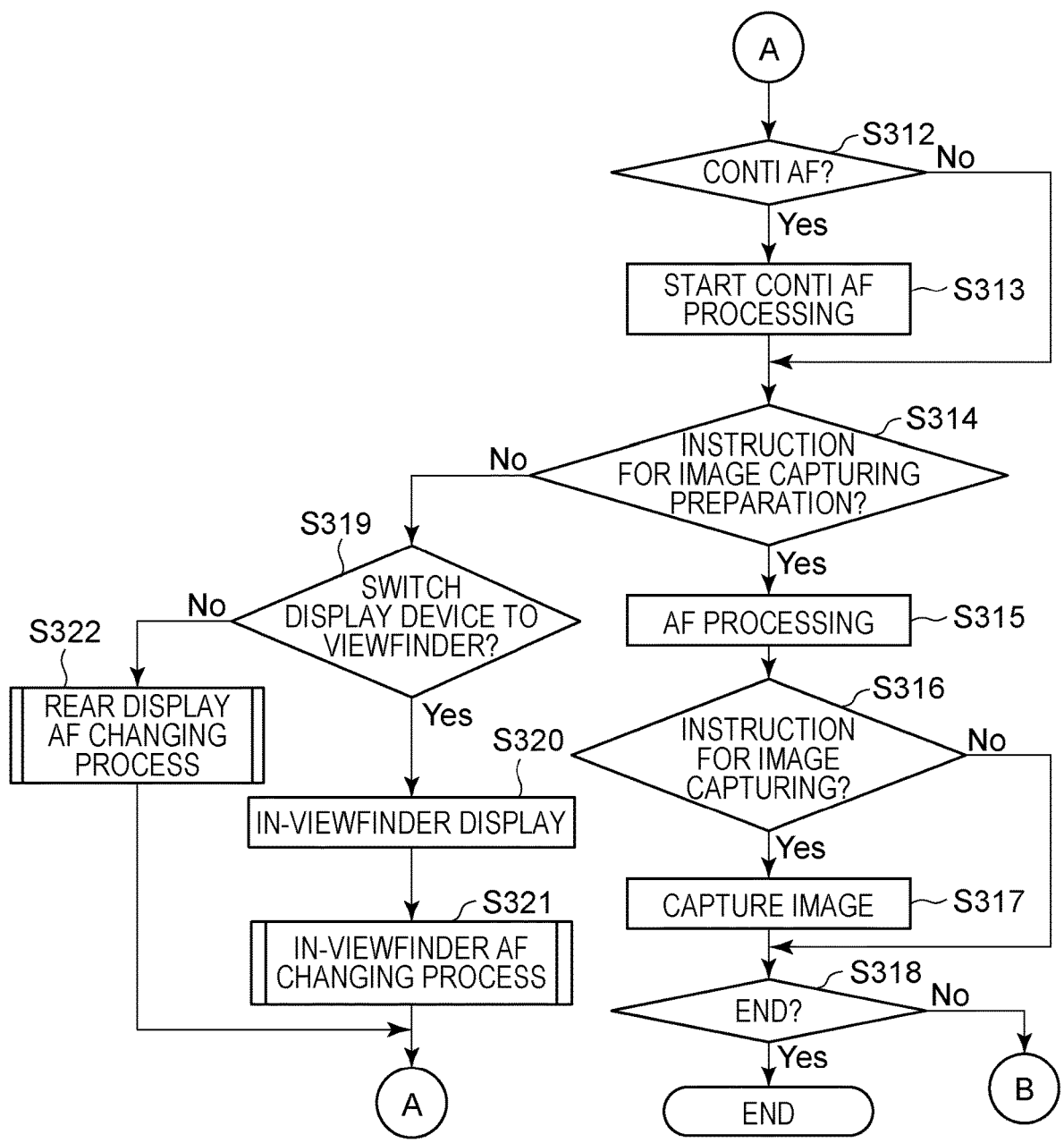

Next, an image capturing process in the present embodiment will be described with reference to FIGS. 3A and 3B. This process is performed by a program, which is recorded on the non-volatile memory 56, being loaded to the system memory 52 and executed by the system control unit 50. Note that this process starts when the digital camera 100 is switched on.

Figure 6A:
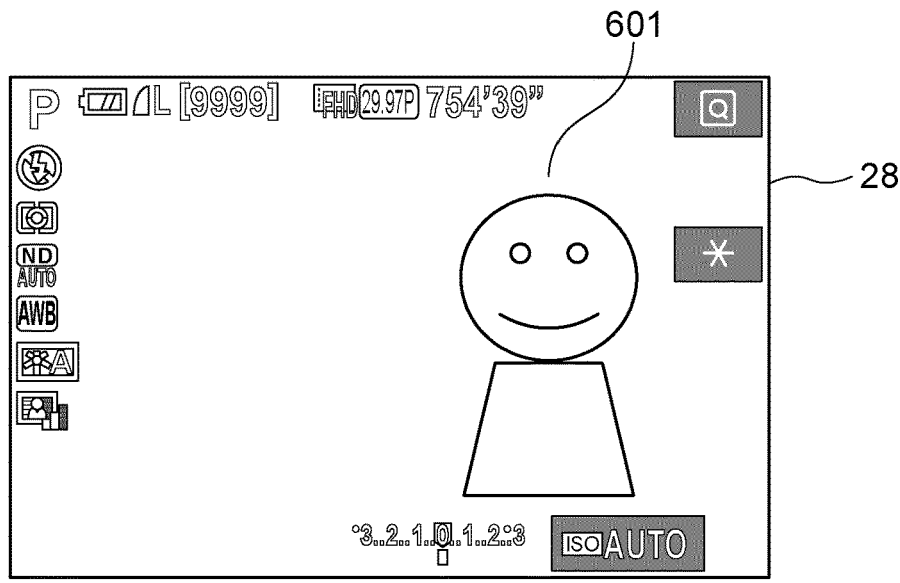
FIGS. 6A to 6C illustrate display examples on a display unit that is on a rear surface in an embodiment.
Figure 6B:
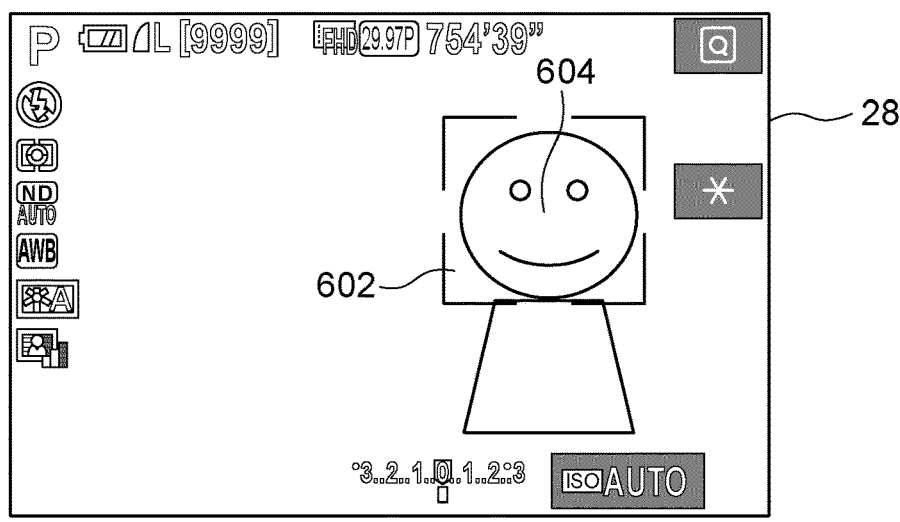
Figure 6C:
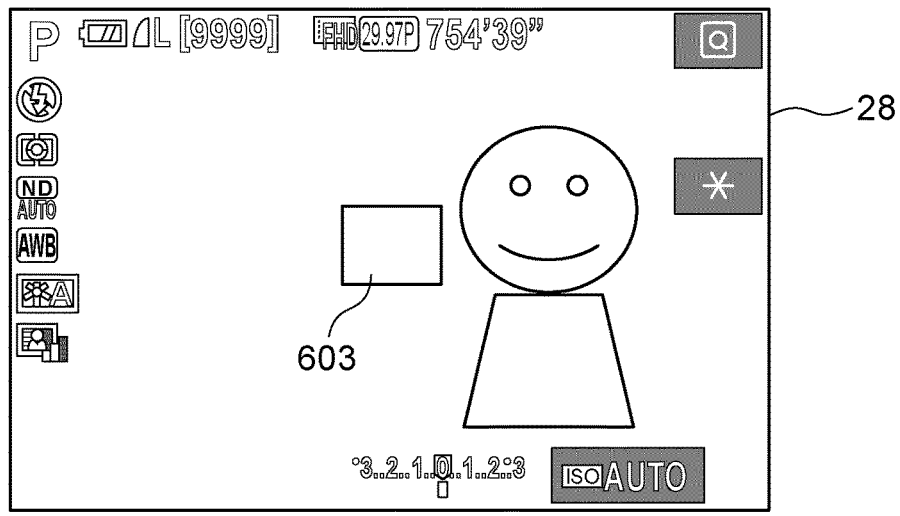

In S301, the system control unit 50 displays a live view image (LV image, captured image) on the display unit 28 on the rear surface of the digital camera 100. FIGS. 6A to 6C illustrate display examples on the display unit 28, which are, in particular, display examples corresponding to the process in FIGS. 3A and 3B. In S301, as illustrated in FIG. 6A, a live view image 601 is displayed on the display unit 28.

In S302, the system control unit 50 determines whether an operation for changing a touch effective area has been performed. The touch effective area is an area in which a function corresponding to a touch operation, which is performed on the touch panel 70a on the rear surface, is performed in response to the touch operation while a user is looking into the viewfinder 16. That is, although the AF frame is moved in response to a touch operation within the touch effective area, the AF frame is not moved even if a touch operation is performed on a touch ineffective area (outside the touch effective area). The touch effective area can be changed by selecting a set item regarding a function of setting the AF position in a menu screen by operating the touch panel 70a while a user is looking into the viewfinder 16. The touch effective area can be selected from the following: the entire surface, a right half area, a left half area, an upper right area, a lower right area, an upper left area, and a lower left area. If it is determined that an operation for changing the touch effective area has been performed, the process proceeds to S303; if not, the process proceeds to S304.

In S303, the system control unit 50 changes the touch effective area and records the changed touch effective area on the non-volatile memory 56.

In S304, the system control unit 50 determines whether the AF method is to be changed. The AF method is any of the following: single point AF; and face priority+tracking AF. The AF method can be changed by selecting a set item regarding the AF processing in the menu screen. If it is determined that the AF method is to be changed, the process proceeds to S305; if not, the process proceeds to S306.

In S305, the system control unit 50 changes the AF method. That is, if the AF method is single point AF at first, the AF method is changed to face priority+tracking AF; if the AF method is tracking AF at first, the AF method is changed to single point AF.

In S306, the system control unit 50 determines whether the current setting of the AF method is single point AF. If it is determined that the AF method is single point AF, the process proceeds to S307; if not, the process proceeds to S308.

In S307, the system control unit 50 displays the AF frame at the center position of the display unit 28. In S307, like an AF frame 603 illustrated in FIG. 6C, the AF frame is displayed at the center position as an initial position.

In S308, the system control unit 50 performs face detection processing. Since the determination in S306 is NO, that is, it is determined that the AF method is face priority+tracking AF, processing for detecting a person's face within the image capturing range is performed in S308.

In S309, the system control unit 50 determines whether a face has been detected through the detection processing in S308. If it is determined that a face has been detected, the process proceeds to S310; if not, the process proceeds to S311. Note that the face detection processing is continuously performed in and after S309 until an instruction for image capturing preparation is issued.

In S310, the system control unit 50 displays a face detection frame at the position of the face that has been determined to have been detected in S309. In S310, as illustrated in FIG. 6B, a face detection frame 602 is displayed at the position of a face detection frame 604 that has been detected. By the face detection frame 604 being displayed, a user can recognize the person's face that has been detected. Note that a plurality of persons' faces may be displayed with the respective face detection frames. Alternatively, a face having the largest area may be displayed with a white frame, and the other faces may be displayed with frames with a single line that is thinner than the white frame.

In S311, the system control unit 50 does not display the face detection frame because a face has not been detected in S309. At this time, a provisional frame is displayed at the center position of the in-viewfinder display unit 76.

In S312, the system control unit 50 determines whether Continuous AF has been set. If Continuous AF has been set, AF processing is performed such that a predetermined subject is continuously in focus, not at a timing of an AF instruction from a user. That is, if Continuous AF has been set, AF processing is not started in response to an instruction for image capturing preparation such as a half press of the shutter button 61, but AF processing is performed such that the subject is continuously in focus. Accordingly, even when the tracked subject moves, the subject can be in focus at the moved position. If Continuous AF has been set, the process proceeds to S313; if not, the process proceeds to S314.

In S313, the system control unit 50 starts Continuous AF processing at a position where the AF frame, the face detection frame, or the provisional frame is displayed. Since it is determined in S312 that Continuous AF has been set, the processing in S313 is continued until an instruction for image capturing preparation in S314 is issued. Note that, even if a face has not been detected in S309, Continuous AF processing is performed at the center position of the display unit 28. If the provisional frame is displayed, AF processing is performed such that a subject at the center position of the in-viewfinder display unit 76 is continuously in focus.

In S314, the system control unit 50 determines whether an instruction for image capturing preparation has been issued. If it is determined that an instruction for image capturing preparation has been issued, the process proceeds to S315; if not, the process proceeds to S319. The instruction for image capturing preparation can be issued by a half press of the shutter button 61 or a press of an AF instruction button.

In S315, the system control unit 50 performs AF processing at the position where the AF frame or the face detection frame is displayed. Also when Continuous AF is performed, AF processing is performed in response to the instruction for image capturing preparation in S314.

In S316, the system control unit 50 determines whether an instruction for image capturing has been issued. If it is determined that an instruction for image capturing has been issued, the process proceeds to S317; if not, the process proceeds to S318. The instruction for image capturing can be issued by a full press of the shutter button 61.

In S317, the system control unit 50 performs image capturing processing. A record image that has been subjected to AF processing in S315 is recorded on the recording medium 200.

In S318, the system control unit 50 determines whether the image capturing process is to end. The image capturing process is ended by switching off the digital camera 100 or transferring the screen to a playback screen. If it is determined in S318 that the image capturing process is to end, the image capturing process is ended; if not, the process proceeds to S302.

In S319, the system control unit 50 determines whether the display device has been switched to the in-viewfinder display unit 76 in the viewfinder 16. The display device can be switched from the display unit 28 to the in-viewfinder display unit 76 by the proximity detecting unit 57 detecting the proximity of an object to the viewfinder 16 with a distance therebetween being less than a predetermined length. Alternatively, the display device may be switched between the in-viewfinder display unit 76 and the display unit 28 by a button operation or the like performed by a user. If it is determined that the display device has been switched to the in-viewfinder display unit 76 or that the display device remains the in-viewfinder display unit 76, the process proceeds to S320; if not, the process proceeds to S322.

In S320, the system control unit 50 displays a live view image on the in-viewfinder display unit 76. At this time, the live view image is not displayed on the display unit 28.

In S321, the system control unit 50 performs an in-viewfinder AF changing process. The in-viewfinder AF changing process will be described later with reference to FIGS. 4A and 4B.

In S322, the system control unit 50 performs a rear display AF changing process. The rear display AF changing process will be described later with reference to FIG. 5.

Next, the in-viewfinder AF changing process will be described with reference to FIGS. 4A and 4B. This process is performed by a program, which is recorded on the non-volatile memory 56, being loaded to the system memory 52 and executed by the system control unit 50. The in-viewfinder AF changing process starts when the process proceeds to S321 in FIG. 3B. In S321, although a live view image is displayed on the in-viewfinder display unit 76 and is not displayed on the display unit 28, a touch operation on the touch panel 70a integrated with the display unit 28 is effective. Note that in addition to the live view image, an item such as an AF frame, a tracking frame, or a face detection frame is also displayed (in use state) on the in-viewfinder display unit 76.

Figure 4A:
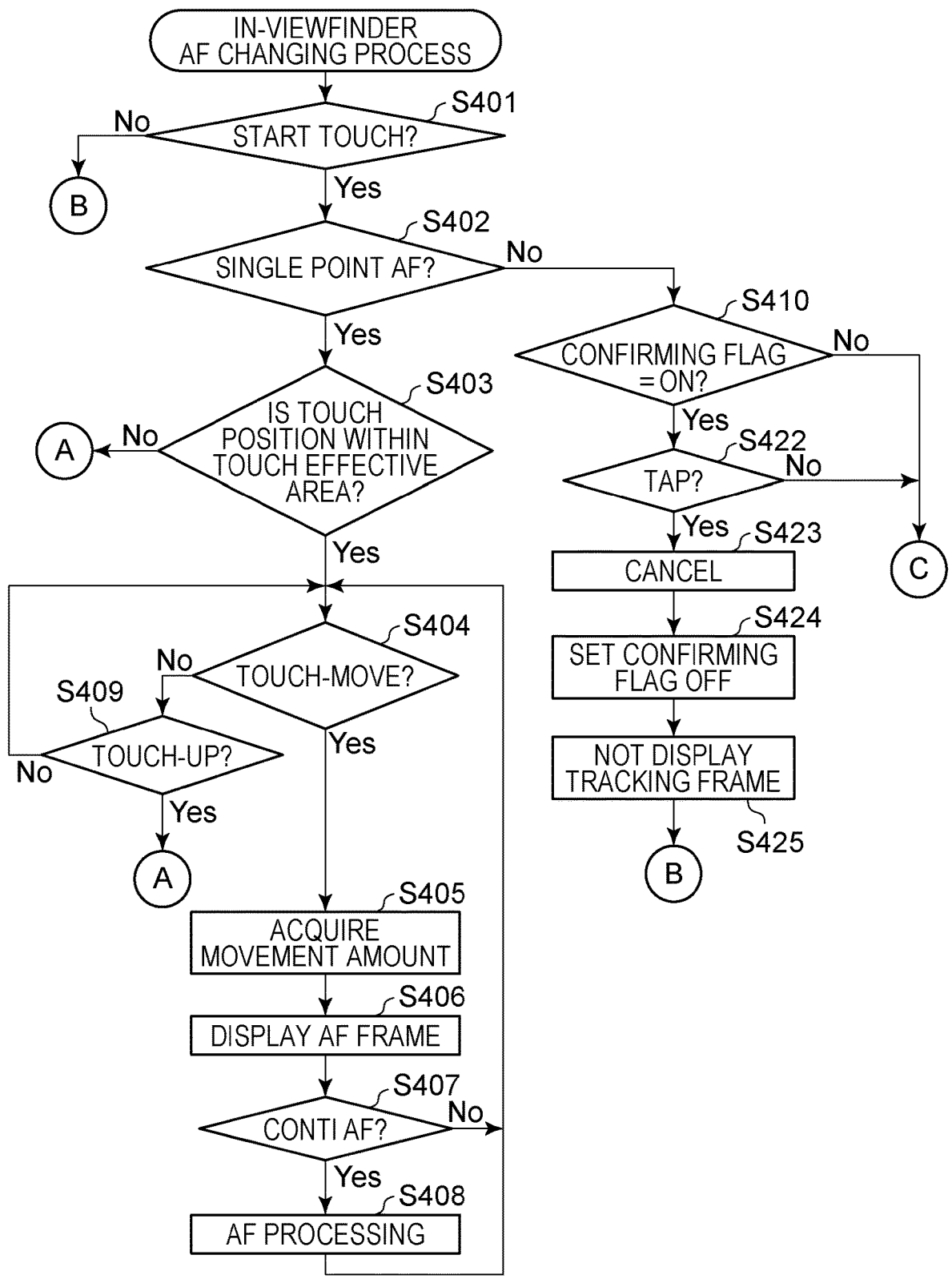
FIGS. 4A and 4B are flowcharts illustrating an in-viewfinder AF changing process in an embodiment.
Figure 4B:
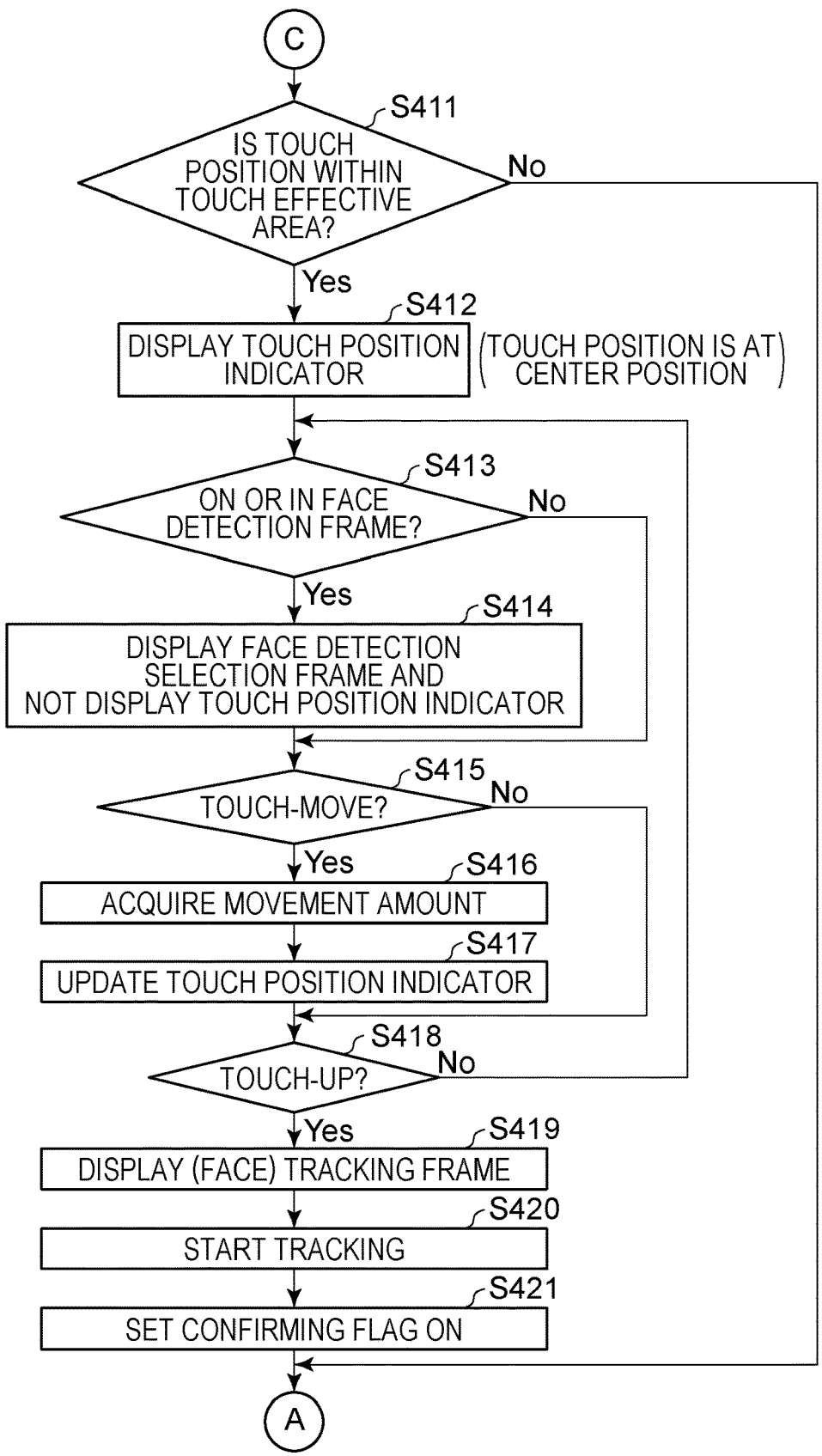
Figure 7A:
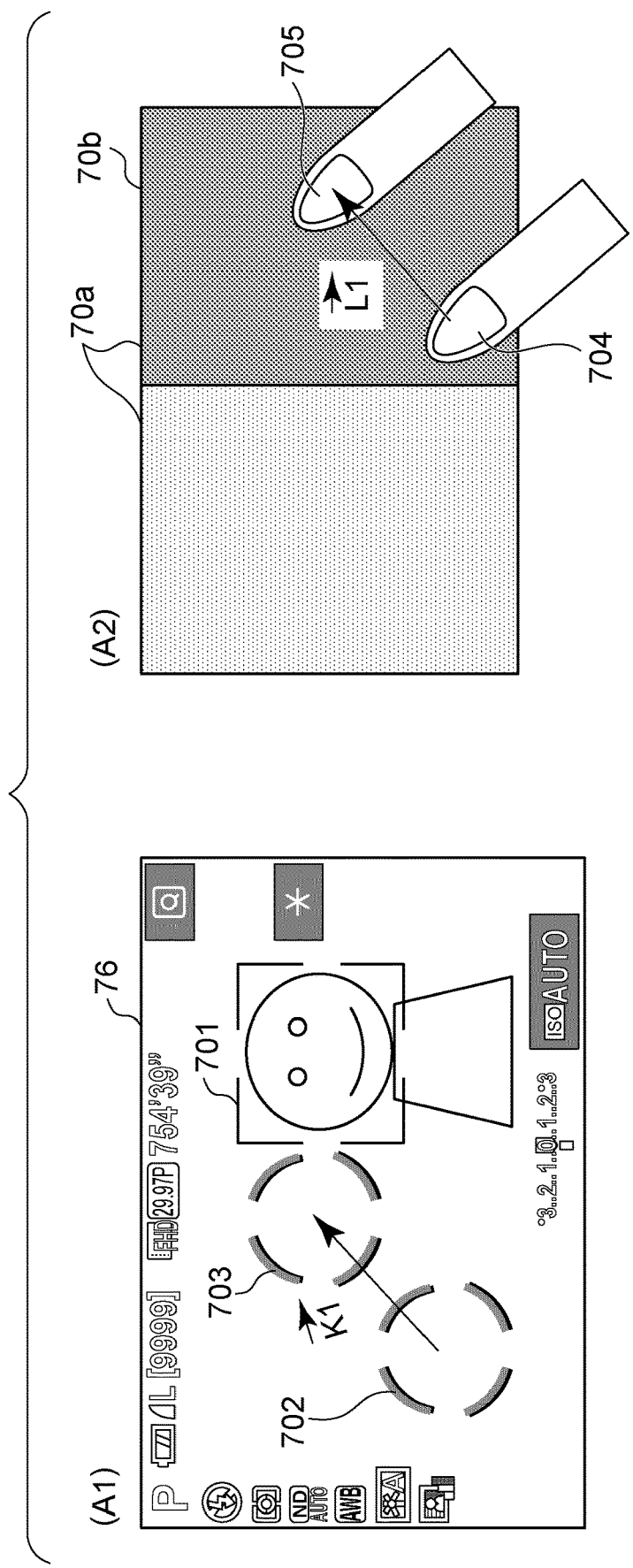

Although the touch effective area is the right half area in the description of FIGS. 4A and 4B, the embodiments are not limited to this example. Note that the following description will be given with reference to FIGS. 7A to 7E. FIGS. 7A to 7E illustrate the states of display on the in-viewfinder display unit 76 and the states of touch operations on the touch panel 70a during the in-viewfinder AF changing process. FIGS. 7A(A1), 7B, 7C(C1), 7D(D1), and 7E(E1) each illustrate a display example on the in-viewfinder display unit 76. FIGS. 7A(A2), 7C(C2), 7D(D2), and 7E(E2) each illustrate the state of a touch operation on the touch panel 70a, and an effective area 70b in the right half area represents the touch effective area described above in S302 and S303 in FIG. 3A.

In S401, the system control unit 50 determines whether a touch operation on the touch panel 70a has been started. That is, the system control unit 50 determines whether Touch-Down has been performed on the touch panel 70a. In the determination in S401, it is irrelevant whether a touch position is within the above-described touch effective area on the touch panel 70a. If it is determined that the touch operation on the touch panel 70a has been started, the process proceeds to S402; if not, the process proceeds to S302 in FIG. 3A.

In S402, the system control unit 50 determines whether the current AF method is single point AF. If it is determined that the current AF method is single point AF, the process proceeds to S403; if not, the process proceeds to S410.

In S403, the system control unit 50 determines whether the touch position, that is, the position of Touch-Down, is within the touch effective area. FIG. 7E illustrates a case in which the AF method is single point AF. In S403, it is determined whether the touch position is within the effective area 70b. As illustrated in FIG. 7E(E2), if a touch position 711 is within the effective area 70b, the determination in S403 is YES. If it is determined that the touch position is within the touch effective area, the process proceeds to S404; if not, the process proceeds to S312 in FIG. 3B. That is, in a case of single point AF, unless the effective area 70b that has been set is touched, processing regarding the movement of the AF frame is not performed. A touch operation for moving the AF frame is received within the effective area. Without the effective area, depending on a user, when the user looks into the viewfinder 16, a part of their face such as nose may touch the touch panel 70a, and the AF frame may be moved unintentionally. In addition, a user having small hands or a user who grips the digital camera 100 firmly cannot touch the entire surface of the touch panel 70a with their fingers and may touch the touch panel 70a with their nose or the like. Accordingly, if a reachable range is set as the effective area for each user, the operability is increased.

In S404, the system control unit 50 determines whether the touch position has been moved, that is, Touch-Move has been performed. If it is determined that the touch position has been moved, the process proceeds to S405; if not, the process proceeds to S409. Note that the touch position is moved within the effective area 70b. An operation in which the touch position becomes out of the effective area 70b corresponds to Touch-Up, and the process proceeds to S312 in FIG. 3B.

In S405, the system control unit 50 acquires the movement amount of the touch position. The following description will be given on the assumption that, if the touch position is moved from the touch position 711 to a touch position 712 in FIG. 7E(E2), the movement amount thereof is a movement amount L2.

In S406, in accordance with the movement amount of the touch position acquired in S405, the system control unit 50 moves the AF frame on the in-viewfinder display unit 76. If the AF frame is displayed at the position of an AF frame 713 in FIG. 7E(E1) before movement of the touch position, the AF frame is moved by a movement amount K2 in accordance with the movement amount L2 of the touch position acquired in S405, and is displayed at the position of an AF frame 714. As illustrated in FIG. 7E(E1), if the movement amount of the touch position is the movement amount L2, the AF frame is moved from the AF frame 713 to the AF frame 714 by a movement amount in accordance with the movement amount L2. Note that the movement method of the AF frame can be set as relative position movement or absolute position movement. In the relative position movement, the AF frame is moved from the position where the AF frame is displayed before a touch operation by a movement amount in accordance with the movement amount of the touch position. In the absolute position movement, the AF frame is displayed at the coordinates on the in-viewfinder display unit 76 corresponding to the coordinates within the effective area 70b. In a case of the absolute position movement, in S404, the AF frame is displayed at the position on the in-viewfinder display unit 76 corresponding to the touch position even if movement of the touch position has not been detected.

In S407, the system control unit 50 determines whether Continuous AF has been set. If Continuous AF has been set, the process proceeds to S408; if not, the process proceeds to S404.

In S408, the system control unit 50 starts Continuous AF processing at the position where the AF frame or the face detection frame is displayed. If Continuous AF has been set in a case of single point AF, processing is performed such that a display position of the AF frame is continuously in focus.

In S409, the system control unit 50 determines whether an operation for releasing the touch from the touch panel 70a has been performed, that is, Touch-Up has been performed. If it is determined that the operation for releasing the touch has been performed, the process proceeds to S312 in FIG. 3B; if not, the process returns to S404.

The process in and after S410 is a process in a case in which the AF method is the face priority+tracking AF.

In S410, the system control unit 50 determines whether a confirming flag is on. The confirming flag indicates that a tracking target has already been confirmed by a user operation. If a tracking target has already been confirmed, as illustrated in FIG. 7C(C1), a face tracking frame 707 is displayed on the in-viewfinder display unit 76. On the other hand, if a tracking target has not been confirmed, an operation for setting the tracking target has not been performed, or tracking has been canceled. Note that, if a tracking target has not been confirmed, the face tracking frame is not displayed. The confirming flag is recorded on the system memory 52. If it is determined that the confirming flag is on, the process proceeds to S422; if not, the process proceeds to S411.

In S411, the system control unit 50 determines whether the touch position is within the effective area 70b. If it is determined that the touch position is within the effective area 70b, the process proceeds to S412; if not, the process proceeds to S312 in FIG. 3B.

In S412, the system control unit 50 displays a touch position indicator indicating the touch position on the in-viewfinder display unit 76. If the absolute position movement has been set as the movement method of the AF frame, the touch position indicator is displayed at the position on the in-viewfinder display unit 76 corresponding to the touch position within the effective area 70b determined in S401. If the relative position movement has been set, the touch position indicator is displayed at the center position of the in-viewfinder display unit 76 regardless of the touch position within the effective area 70b. As illustrated in FIG. 7A(A1), a touch position indicator 702 and a face detection frame 701 indicating the position of the detected face are displayed. The touch position indicator indicates the coordinates that are currently selected and does not indicate the tracking target.

In S413, the system control unit 50 determines whether the touch position indicator is on or in the face detection frame. That is, the system control unit 50 determines whether the touch position indicator 702 is within an area where the face detection frame 701 is displayed. In other words, it is determined whether a user who has tried to select the detected face has moved the touch position indicator to the face detection frame. If it is determined that the touch position indicator is on or in the face detection frame, the process proceeds to S414; if not, the process proceeds to S415.

Figure 7B:
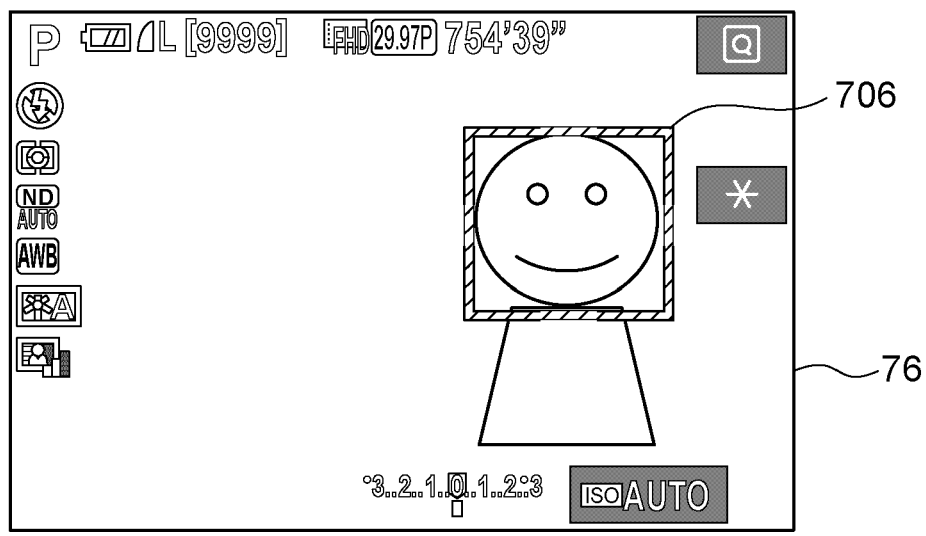

In S414, the system control unit 50 displays a face detection selection frame on the in-viewfinder display unit 76 and does not display the touch position indicator. That is, as illustrated in FIG. 7B, a face detection selection frame 706 is displayed by changing a display mode such that the face detection selection frame 706 is slightly thicker than the face detection frame 701 in FIG. 7A(A1) and its color is changed to an outstanding color. Specifically, in a case in which the face detection frame 701 in FIG. 7A(A1) is displayed as a white line and the touch position indicator 702 is displayed in orange, in accordance with movement of coordinates corresponding to a touch to the position of the face detection frame 701, a thick orange line face detection selection frame is displayed. Since the face detection frame has become thicker and has the same color as the touch position indicator, a user can recognize that the currently detected face is selectable as a tracking target. Note that, at this time, the face is only selectable and is not confirmed as a tracking target. If the touch is released in this state, through the process in and after S419 described later, a subject indicated by the face detection selection frame 706 is confirmed as a tracking target, and tracking is started. Note that the display modes of the face detection frame, the face detection selection frame, and the touch position indicator described with reference to FIGS. 7A to 7E are examples and are not limited to the examples.

In S415, the system control unit 50 determines whether the touch position has been moved, that is, whether Touch-Mode has been performed. If it is determined that the touch position has been moved, the process proceeds to S416; if not, the process proceeds to S418.

In S416, the system control unit 50 acquires the movement amount of the touch position. In FIG. 7A(A2), the following description will be given on the assumption that the movement amount in a case in which the touch position has been moved from a touch position 704 to a touch position 705 is a movement amount L1.

In S417, in accordance with the movement amount of the touch position acquired in S416, the system control unit 50 moves (changes the display position of) the touch position indicator displayed on the in-viewfinder display unit 76. In FIG. 7A(A1), if the touch position indicator has been displayed at the position of the touch position indicator 702 before movement of the touch position, the touch position indicator is updated to be displayed at the position of a touch position indicator 703, which is the position when the touch position indicator is moved by a movement amount K1, which is a movement amount in accordance with the movement amount L1 of the touch position acquired in S416.

In S418, the system control unit 50 determines whether an operation for releasing the touch from the touch panel 70a has been performed (whether Touch-Up has been performed). If it is determined that an operation for releasing the touch has been performed, the process proceeds to S419; if not, the process returns to S413. FIG. 7C(C2) illustrates a state in which the touch is released after the touch has been started. Note that in addition to the release of the touch, if the touch position becomes out of the effective area 70b, the determination in S418 is also YES. In the rear display AF changing process described later, the tracking target is determined upon the start of the touch operation (Touch-Down). However, in the process in FIG. 4, the tracking target is not confirmed until the touch is released because the display at hand is hard to see while looking into the viewfinder 16. That is, in response to the release of the touch, at the timing of the release of the touch, a subject at the position of the touch position indicator or the face detection selection frame displayed by being superimposed on the touch position indicator is confirmed as the tracking target (an operation for releasing the touch is a confirmation operation).

In S419, the system control unit 50 displays a tracking frame or a face tracking frame on the in-viewfinder display unit 76. In response to the operation for releasing the touch determined in S418, the tracking target is confirmed, and a frame indicating the tracking target determined in S419 is displayed. If the detected face is selected as the tracking target, a face tracking frame is displayed in S419. If the touch is released from the state in which the face detection selection frame 706 in FIG. 7B is displayed, the face indicated by the face detection selection frame 706 is confirmed as the tracking target, and the face tracking frame 707 is displayed as illustrated in FIG. 7C(C1). If a subject other than a face is selected as the tracking target, or if a face that has not been detected is selected as the tracking target, a tracking frame is displayed. The face tracking frame 707 in FIG. 7C(C1) illustrates display on the in-viewfinder display unit 76 after the touch has been released from the state of the face detection selection frame 706 in FIG. 7B. Both the face tracking frame and the tracking frame are displayed as a white double line. The face tracking frame 707 and the face detection frame are displayed to be slightly larger than the detected face. Thus, it is possible to prevent the frame from being superimposed on the person's face; otherwise, the person's expression is hard to see.

In S420, the system control unit 50 starts tracking the subject displayed with the tracking frame or the face tracking frame in S419. Even if the subject as the tracking target moves within the image capturing range, the subject is continuously displayed with the tracking frame at the moved position. If there are a plurality of faces, upon a person's face being selected, the selected face is tracked. Even if the selected face is out of the image capturing range for one second or two, the face coming into the image capturing range again is still tracked and detected. In addition, if the tracking target is not confirmed (the face detection frame is displayed), a face having the largest area is set as a primary face and displayed with a white face detection frame, and faces having smaller areas are set as secondary faces and displayed with gray detection frames. In this case, if the area of the primary face is reduced, the white face detection frame is displayed for another face. However, if the face tracking frame is displayed for the confirmed the tracking target, the tracking target is not changed to another face against a user's intention.

In S421, the system control unit 50 sets the confirming flag on and records the confirming flag on the system memory 52. In addition, a guide illustrating cancelation of tracking by performing a tap operation is displayed as a guide 710 in FIG. 7C(C1). After S421, the process proceeds to S312 in FIG. 3B, and if Continuous AF has been set, the processing is performed such that the tracking target is continuously in focus.

On the other hand, if the confirming flag is already on in S410, the system control unit 50 determines in S422 whether a tap operation has been performed. The tap operation herein is an operation in which, after the start of the touch on the touch panel 70a in S401, the touch is released quickly without movement of the touch position within a predetermined period of time as short as, for example, 0.1 or 0.2 seconds. If a tap operation has been performed, the determination in S411 is YES regardless of whether the touch position in S401 is within or outside the effective area 70b. That is, the tap operation in the present embodiment is an operation for canceling the tracking target confirmed by a user or for stopping tracking, and is effective in any area on the touch panel 70a, not a restricted area such as the touch effective area. As illustrated in FIG. 7D(D2), if a tap operation is performed even at a touch position 708 outside the effective area 70b, the determination in S422 is YES. If a user wishes to cancel tracking, there is a high possibility that the user wishes to perform a cancel operation quickly rather than to perform the operation more slowly and carefully than to move the tracking frame so as to transfer to the next setting. If tracking is canceled in accordance with a tap operation within the effective area 70b or a specific area, it may be difficult to touch the effective area 70b or the specific area at the first touch, resulting in a plurality of times of operations and a delay of cancelation. Accordingly, if cancelation of tracking is enabled by only performing a tap operation even outside the touch effective area, the cancelation can be performed quickly. That is, the area for receiving the cancel operation is larger than the area for receiving a touch operation for moving the tracking frame, or, in a case in which the touch effective area is the entire surface, the area for receiving the cancel operation is the same as the touch effective area. Thus, an instruction for cancelation of tracking can be issued quickly. In other words, the cancel operation can be received within the same area as the area for receiving a touch operation for moving the tracking frame. Thus, a user can issue a different instruction by changing the type of touch operation. Further, in other words, the area for receiving the cancel operation and the area for receiving a touch operation for moving the tracking frame are not provided independently of each other. Thus, even if the display at hand is hard to see to perform the touch operation, the operability is not decreased. If it is determined that a tap operation has been performed, the process proceeds to S423; if not, the process proceeds to S411. For example, if the movement is less than a predetermined length, such as 0.1 or 0.5 centimeters, it may be determined that a tap operation has been performed. If Touch-Move of less than the predetermined length has been performed, it is determined that a user has unintentionally moved the touch position in the process of a tap operation, and Touch-Move is not detected.

In S423, the system control unit 50 cancels tracking and stops tracking the tracking target that has been tracked until S422. Note that if tracking is canceled, the subject selected by a user is no longer tracked. However, as long as Continuous AF is set, AF processing is performed. If a face has not been detected, a subject at the center position of the image capturing range, for example, is continuously in focus; if a face has been detected, the detected face is continuously in focus. Since tracking is canceled at the timing of the release of the touch in the tap operation, if a user wishes to stop the cancelation before releasing the touch and to keep capturing an image without changing the tracking target, the user may move the touch position without releasing the touch or may release the touch after a long period of time.

In S424, the system control unit 50 sets the confirming flag off and records the confirming flag on the system memory 52.

In S425, the system control unit 50 does not display the tracking frame on the in-viewfinder display unit 76. In response to a tap operation illustrated in FIG. 7D(D2), the face tracking frame 707 is not displayed, and a face detection frame 709 is displayed as illustrated in FIG. 7D(D1). If a face has not been detected, a frame is displayed at the center position of the in-viewfinder display unit 76. In this manner, a tap operation restores the state before movement of the touch position. Specifically, tracking is canceled, and if Continuous AF is set, the focus target may be changed. In addition, the display mode is restored to the state before movement of the touch position, in such a manner that the tracking frame is no longer displayed but a face detection frame or a frame at the center position (initial position) is displayed. Note that the display mode may be changed in another manner if a face becomes detected/no longer detected in the image capturing range between movement of the touch position and the cancelation.

Next, the rear display AF changing process will be described with reference to FIG. 5. This process is performed by a program, which is recorded on the non-volatile memory 56, being loaded to the system memory 52 and executed by the system control unit 50. The rear display AF changing process starts when the process proceeds to S322 in FIG. 3B. In S322, a live view image is displayed on the display unit 28 and is not displayed on the in-viewfinder display unit 76. That is, a user can intuitively perform a touch operation on the touch panel 70a, which is integrated with the display unit 28, while seeing the live view image displayed on the display unit 28. Note that in addition to the live view image, an item such as an AF frame, a tracking frame, or a face detection frame is also displayed (in use state) on the display unit 28.

In S501, the system control unit 50 determines whether a touch operation on the touch panel 70a has been started (whether Touch-Down has been performed). If it is determined that a touch operation on the touch panel 70a has been started, the process proceeds to S502; if not, the process proceeds to S302 in FIG. 3A.

In S502, the system control unit 50 determines whether the current AF method is single point AF. If it is determined that the current AF method is single point AF, the process proceeds to S503; if not, the process proceeds to S504.

In S503, the system control unit 50 displays an AF frame on the coordinates of a touch position on the touch panel 70a in the display unit 28. The AF frame is displayed at the touch position, and if the touch position is moved, the AF frame is also moved to the touch position.

In S504, the system control unit 50 determines whether a confirming flag is on. The confirming flag indicates that a tracking target has already been confirmed by a user operation. If it is determined that the confirming flag is on, the process proceeds to S508; if not, the process proceeds to S505.

Figure 8A:
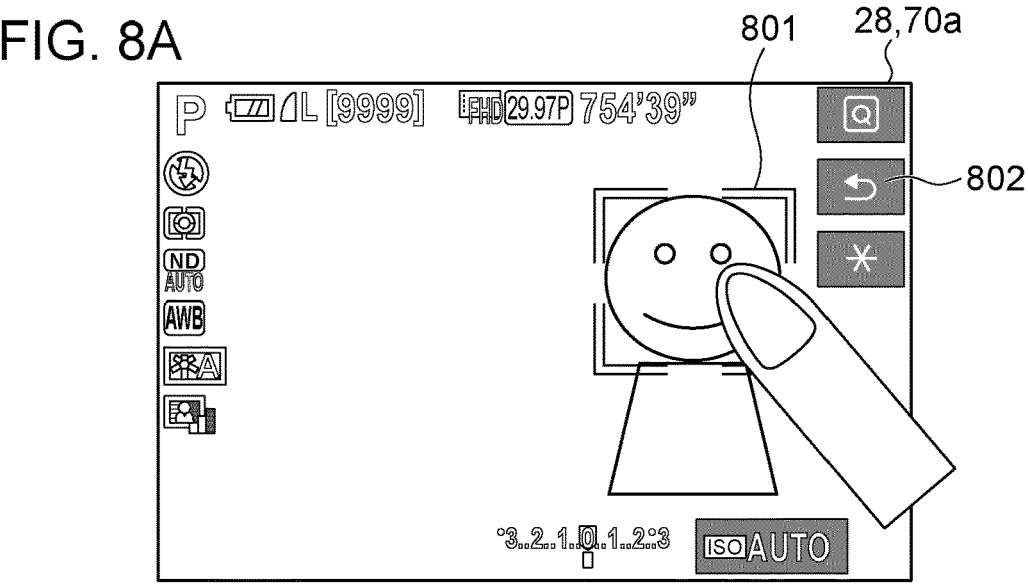
FIGS. 8A to 8C illustrate display examples on the display unit that is on the rear surface in an embodiment.
Figure 8B:
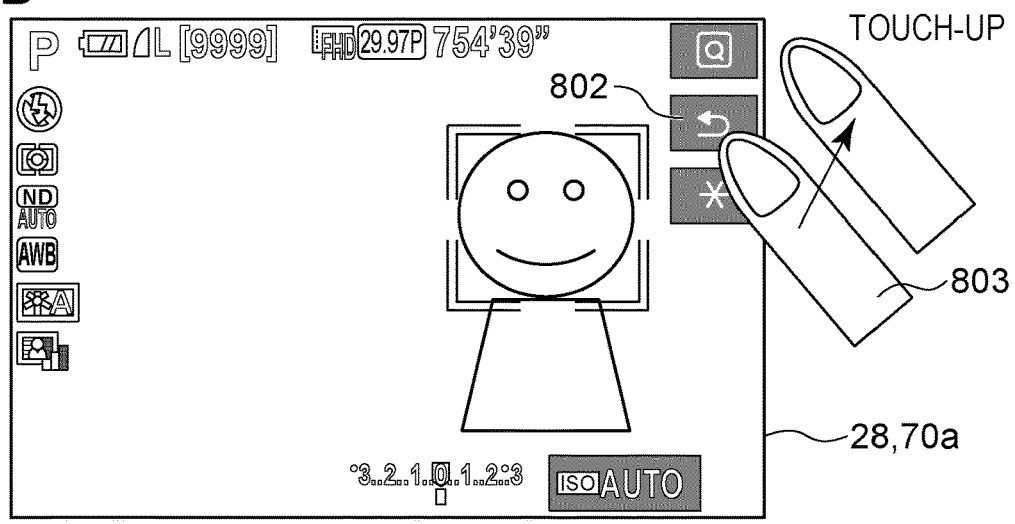
Figure 8C:
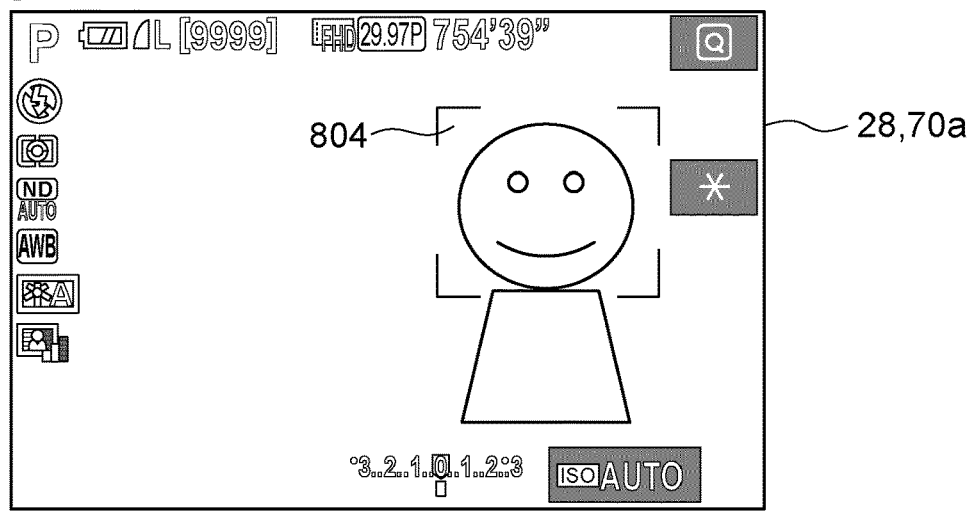

In S505, the system control unit 50 displays a tracking frame at the coordinates of the touch position on the touch panel 70a in the display unit 28. FIGS. 8A to 8C illustrate display examples and the states of touch operations on the display unit 28 during the rear display AF changing process. In response to a touch, a tracking frame 801 as illustrated in FIG. 8A is displayed at a touch position. In addition, a cancel button 802 as illustrated in FIG. 8A, which is a button for receiving a touch operation for cancelation of tracking, is displayed. If a touch operation is performed in the area of the cancel button 802, tracking is canceled. In addition, if a touch operation is performed in an area other than the cancel button 802, a tracking frame is displayed at the position of Touch-Down. In this manner, during the rear display AF changing process, the area for receiving a touch operation for confirming the tracking target and the area for receiving a cancel operation are independent of each other. In addition, since the area for receiving a cancel operation is smaller than the area for receiving a touch operation for confirming the tracking target, it is possible to prevent the area for receiving a cancel operation from being superimposed on a live view image; otherwise, the visibility of the subject is decreased. Note that if a face has been detected, a face detection frame (the face detection frame 602 in FIG. 6B) is changed to a tracking frame such as the tracking frame 801. However, if a touch operation is performed on a subject that is not the detected face, the face detection frame is no longer displayed.

In S506, the system control unit 50 starts tracking a subject displayed in the tracking frame in S505.

In S507, the system control unit 50 sets the confirming flag on and records the confirming flag on the system memory 52.

In S508, the system control unit 50 determines whether the position at which the touch operation has been started in S501 is within the area of the cancel button 802 displayed in S505. If it is determined that the position at which the touch operation has been started is within the area of the cancel button 802, the process proceeds to S509; if not, the process proceeds to S505.

In S509, the system control unit 50 determines whether Touch-Up has been performed in the area of the cancel button. As illustrated in FIG. 8B, when Touch-Down is performed by a touch finger 803 on the cancel button 802 and Touch-Up from the cancel button 802 is performed, tracking is canceled. However, if the touch position is moved and Touch-Up is performed in an area outside the cancel button 802, tracking is not canceled. During the rear display AF changing process, the live view image as a selection target and the touch panel 70a are integrated with each other. Thus, a user can select a desired subject more intuitively and accurately. Accordingly, as described above in S505 and S506, the tracking target is confirmed by Touch-Down. If a cancel operation is receivable on the live view image, a user who wishes to perform a cancel operation may change the tracking target to a subject at the touch position. Accordingly, the area for receiving a cancel operation and the area for moving the tracking frame are independent of each other, and further, tracking is canceled by Touch-Down and Touch-Up on the cancel button 802. This makes it difficult for a user to unintentionally cancel tracking even if the user touches the cancel button. If it is determined that Touch-Up has been performed in the area of the cancel button, the process proceeds to S510; if not, the process proceeds to S302 in FIG. 3A.

In S510, the system control unit 50 sets the confirming flag off and records the confirming flag on the system memory 52.

In S511, the system control unit 50 does not display the tracking frame on the display unit 28. As illustrated in FIG. 8C, a face detection frame 804 is displayed and the cancel button 802 is no longer displayed. If a face has not been detected, a frame is displayed at the center position of the display unit 28.

According to the above-described embodiments, during the in-viewfinder AF changing process, a user can perform a cancel operation only by tapping the touch panel 70a without seeing their finger to perform a touch operation or caring about the touch position. In addition, depending on the area, an instruction for different processing is issued in response to a touch operation during the rear display AF changing process, and thereby a possibility of issuing an instruction against a user's intention is decreased. Thus, in a case in which a user operates the touch panel while seeing display on the viewfinder, the user can quickly perform an operation for stopping predetermined processing such as tracking, and in addition, in a case in which the user operates the touch panel while seeing the operation surface, an intended instruction is easily issued.

In a case in which cancelation is performed by performing, instead of a touch operation, an operation on an operation member other than the touch panel 70a, such as a button member, an operation may be performed for moving a finger from the state in which the finger touches the touch panel 70a, which takes time to perform cancelation. In a case in which the forefinger of the right hand holding the digital camera 100 is used for pressing the shutter button, the thumb is used for performing a touch operation, and the other fingers are gripping the grip unit, the thumb has to be moved from the touch panel 70a to, for example, the position of the SET button 75. Thus, if a cancel operation can be performed by performing a touch operation without moving, the user's operability is high. In addition, since an operation sound is generated by operating a button member or the like while recording a moving image, a cancel operation is desirably performed by performing a touch operation.

If the display device of a live view image is the in-viewfinder display unit 76, unlike when the display unit 28 displays a live view image, cancelation can be performed by performing a tap operation on a plurality of areas (positions). Thus, while a live view image is displayed on the display unit 28, the visibility is not decreased by displaying some cancel buttons. In addition, while a live view image is displayed on the in-viewfinder display unit 76, a button or the like is not displayed, and a cancel operation is more easily performed. If a cancel button is provided while a live view image is displayed on the in-viewfinder display unit 76, a user has to move the touch position indicator to the cancel button or to touch a corresponding position. Thus, there is a possibility that the user cannot perform cancelation quickly and accurately. However, if cancelation is enabled in response to a tap operation on any position on the touch panel 70a, the user can perform cancelation more quickly and accurately.

Although the above-described embodiments have illustrated examples in which a user can understand the state by differentiating the display mode of an item such as the touch position indicator, the face detection selection frame, the tracking frame, or the face tracking frame, these are predetermined items for indicating a subject as a tracking target.

Figure 9B:
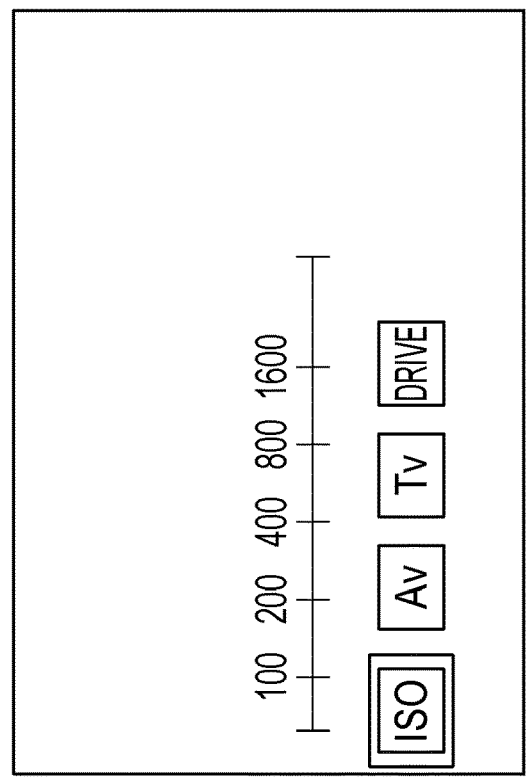
FIGS. 9A and 9B illustrate application examples of an embodiment.
Figure 9A:
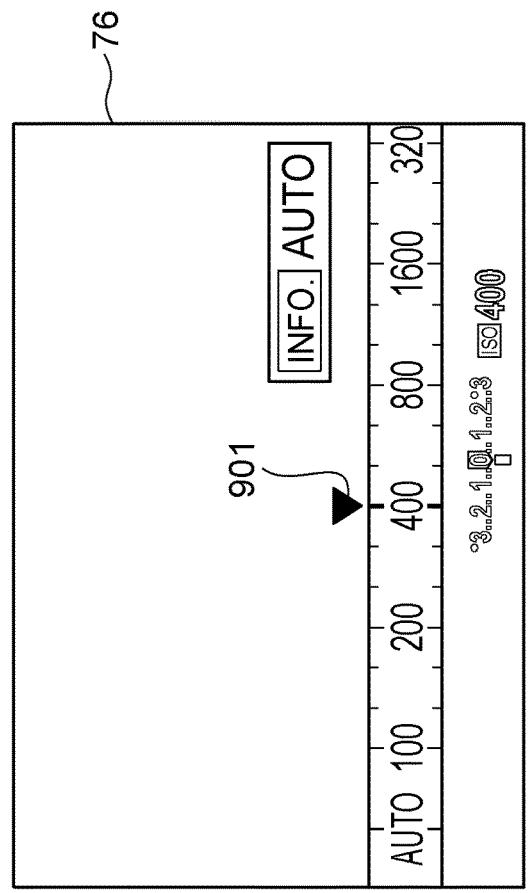

Although the above-described embodiments have illustrated cases in which the tracking target is set as examples, the present disclosure is applicable to a case in which ISO (International Organization for Standardization) sensitivity is set as illustrated in FIG. 9A. That is, in a case in which the display device is the in-viewfinder display unit 76 and a user is operating the touch panel 70a outside the viewfinder 16, in response to a Touch-Move operation, a set value at the position of an indicator 901 indicating the set value is changed. The set value may be changed automatically (AUTO in FIG. 9A) (ISO sensitivity may be set automatically) in response to a tap operation. At this time, in a case in which the display device is the display unit 28, the ISO sensitivity is set to a set value at a touch position, or is set automatically in response to a touch on AUTO. Even if AUTO is not touched, after a user has changed the set value by performing a touch operation, in response to a tap operation, the set value may be changed to the value that has been set before the touch operation.

As illustrated in FIG. 9B, if the display device is the in-viewfinder display unit 76, a set value may be changed by performing a Touch-Move operation, and an item for which the set value is changed may be switched by performing a tap operation. For example, in a case in which the ISO sensitivity has been set as illustrated in FIG. 9B, the set value of the ISO sensitivity may be changed by performing a Touch-Move operation, and the item may be switched to an aperture value (Av) by performing a tap operation. After the item has been switched to the aperture value by performing a tap operation, the set value of the aperture value is changed by performing a Touch-Move operation. If the display device is the display unit 28, in order to switch the item from the ISO sensitivity to the aperture value, a corresponding item displayed on the display unit 28 is touched, and a desired set value is touched on a displayed list of set values to confirm the set value.

The above-described embodiments have illustrated examples in which, depending on whether a live view image is displayed on the in-viewfinder display unit 76 or the display unit 28, the area for receiving a touch operation for performing cancelation is changed. However, without limitation to these examples, the present disclosure is also applicable to the following case. That is, depending on whether an item indicating the position of an operation target or an item indicating a set value is displayed on a display unit integrated with a touch panel or a display unit that is not integrated with a touch panel, the area for receiving cancelation is changed. For example, in a case in which the display device is an external monitor or a projector but a touch operation is performed on a touch panel (touch pad) that differs from the display device, if the current setting can be canceled quickly by performing a tap operation, the operability is high.

Although the above-described embodiments have illustrated examples in which a live view image is displayed on the in-viewfinder display unit 76, the present disclosure is also applicable to an optical viewfinder on which the live view image is not displayed.

Although the above-described embodiments have illustrated examples in which the tracking frame is moved or canceled by performing a touch operation on the touch panel 70a, a user's input method may be any method other than the touch operation. For example, a user may input the position by performing a gesture operation in a predetermined space, or may input the position by using a pointer. In a case of a gesture operation, cancelation may be performed by moving the tracking frame in the x-axis, y-axis, or z-axis direction in the predetermined space. In a case of inputting the position by using a pointer, the tracking frame may be moved by moving the pointer in a predetermined area, or may be canceled in response to a predetermined operation on the pointer such as blinking of the pointer or a change in the luminous intensity thereof. Also in a case of inputting the position (designating the coordinates) other than the touch operation, cancelation may be received within an area that is the same as or larger than the area for receiving an operation for moving the tracking frame.

Figure 5:
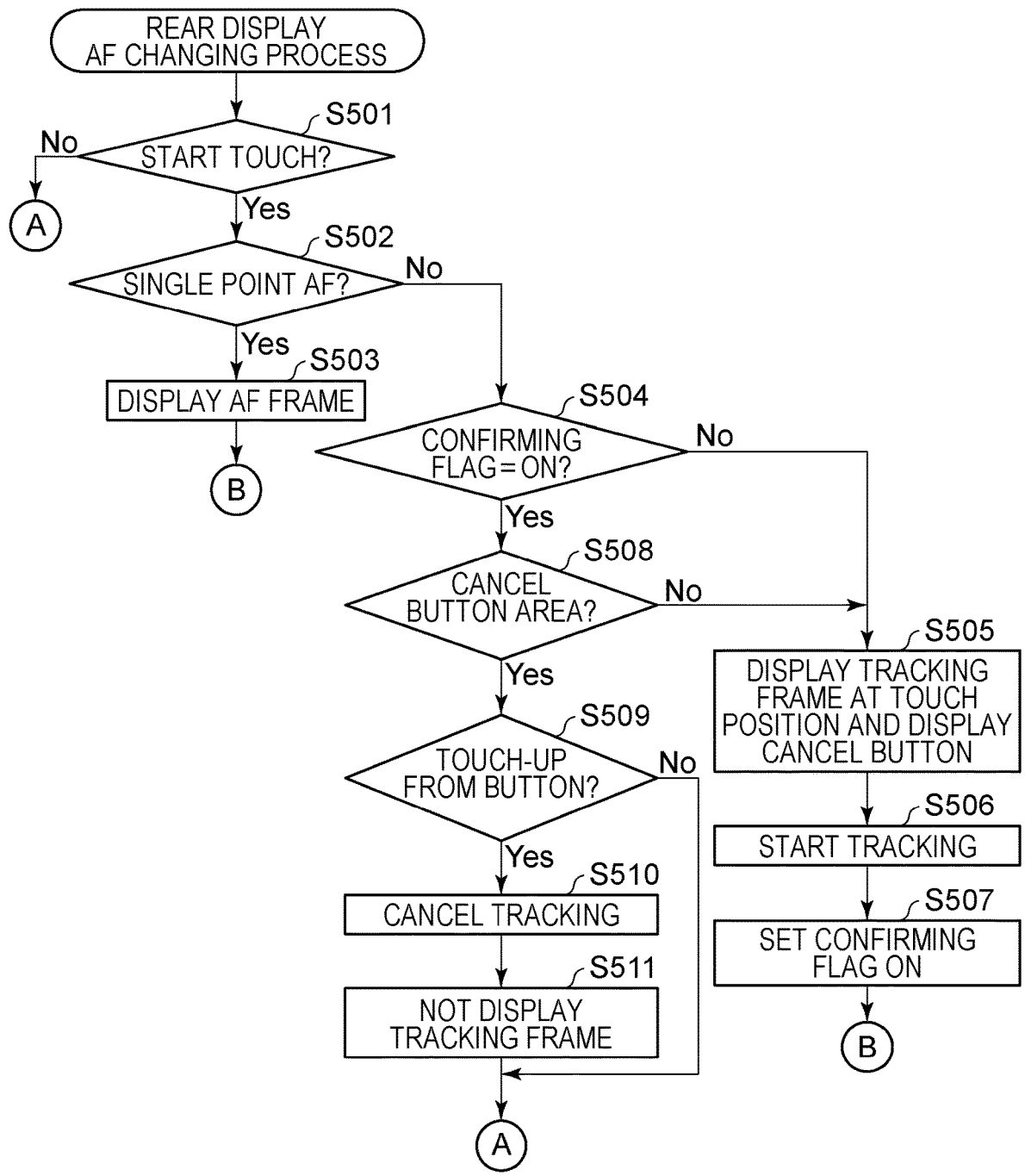
FIG. 5 is a flowchart illustrating a rear display AF changing process in an embodiment.

The above description has illustrated examples in which any of the in-viewfinder AF changing process illustrated in FIG. 4 and the rear display AF changing process illustrated in FIG. 5 is performed depending on whether the in-viewfinder display unit 76 is used (FIG. 4) or the display unit 28 is used. However, the use state may be determined, in addition to display of the AF frame or the tracking frame, in the following manner. That is, the use state may be determined depending on whether a live view image is viewable through the viewfinder 16 or a live view image is displayed on the display unit 28. Alternatively, the use state may be determined depending on whether the proximity detecting unit 57 has detected the proximity of an object to the viewfinder 16 or which display surface a user's line of sight is directed to.

Note that the various kinds of processing described above performed by the system control unit 50 may be controlled by a single hardware unit, or the entire apparatus may be controlled by a plurality of hardware units sharing the processing.

Although the embodiments of the present disclosure have been described above in detail, the present disclosure is not limited to the above specific embodiments, and various modifications without departing from the spirit of the present disclosure are also included in the present disclosure. In addition, the embodiments described above are merely examples of the present disclosure, and elements described in the above embodiments may be combined as appropriate.

Although the above-described embodiments have illustrated examples in which the present disclosure are applied to a digital camera, the present disclosure is not limited to these examples and is applicable to any electronic apparatus that enables display of a display device, not integrated with a touch panel, by performing a touch operation on the touch panel. In addition, the present disclosure is applicable to any electronic apparatus in which processing of display of a display device, not integrated with a touch panel, can be controlled in response to a touch operation on the touch panel. That is, the present disclosure is applicable to a cellular phone terminal, a mobile image viewer, a printer apparatus including a viewfinder, a digital photo frame, a music player, a game machine, an electronic book reader, a home appliance, a personal computer, a tablet, and the like.

According to the embodiments, in a case in which the display device and the operation-detection surface differ from each other, the operability for performing a function that is desired by a user can be increased.

Other Embodiments

The embodiments of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computerized configuration(s) of the system or apparatus by, for example, reading out and executing the computer executable instructions from the storage medium to perform the functions of one or more of the above-described embodiments and/or controlling the one or more circuits to perform the functions of one or more of the above-described embodiments. The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-132702, filed Jul. 6, 2017, which is hereby incorporated by reference herein in its entirety.

What is claimed is:

1. An electronic apparatus comprising:
at least one memory and at least one processor which function as:
a detecting unit configured to detect a touch operation on a display surface of a first display unit;
a switch unit configured to switch between display on the first display unit and display on a second display unit; and
a control unit configured to perform control,
to set a specific state regarding a specific function based on the touch operation on the display surface while a specific screen on which an operation for setting the specific function is receivable is displayed on the first display unit or while the specific screen is displayed on the second display unit, and,
after the specific state being set,
in a case where the specific screen is displayed on the first display unit, to cancel the specific state in response to the touch operation within a first area of the display surface, and,
in a case where the specific screen is displayed on the second display unit, to cancel the specific state in response to the touch operation at any position within a second area that is larger than the first area of the display surface.

2. The electronic apparatus according to claim 1, wherein, while the specific screen is displayed on the first display unit, if the specific state is set, the control unit does not cancel the specific state in response to a touch operation outside the first area.

3. The electronic apparatus according to claim 1, wherein, while the specific screen is displayed on the first display unit, if the specific state is set, the control unit performs control to display a display item for canceling the specific state on the first display unit, and
the first area receives a touch operation on the display item.

4. The electronic apparatus according to claim 1, wherein the second area is an entire area within which a touch operation is detectable by using the detecting unit.

5. The electronic apparatus according to claim 1, wherein, while the specific screen is displayed on the second display unit, if the specific state is set, the control unit performs control to cancel the specific state in response to a release of a touch on the display surface without movement of a touch position.

6. The electronic apparatus according to claim 5, wherein, while the specific screen is displayed on the second display unit, if the specific state is set, the control unit does not cancel the specific state in at least one of a case in which the display surface is touched and the touch is released after movement of a touch position by a predetermined amount or more, and a case in which the display surface is touched and the touch is released after continuation of the touch for a predetermined period of time or more without movement of the touch position.

7. The electronic apparatus according to claim 1, wherein the control unit performs control,
while the specific screen is displayed on the second display unit,
to set the specific state in response to a touch operation within a specific area on the display surface and not to set the specific state even if a touch operation is performed outside the specific area on the display surface, and,
if the specific state is set, regardless of whether the touch operation has been performed within the specific area on the display surface, to cancel the specific state in response to a touch operation at any position within the second area that is larger than the specific area.

8. The electronic apparatus according to claim 7, wherein the specific area is smaller than an entire area within which a touch operation is detectable by using the detecting unit and is set by a user operation.

9. The electronic apparatus according to claim 1, wherein the second display unit is an in-viewfinder display unit that is viewable through a look-into-type viewfinder, and
the first display unit is a display unit outside the look-into-type viewfinder.

10. The electronic apparatus according to claim 9, wherein the specific function is a function regarding image capturing using an image capturing unit.

11. The electronic apparatus according to claim 10, wherein
a live view image captured by the image capturing unit is displayed on the specific screen, and
the specific function is a function for tracking a subject as a tracking target in the live view image captured by the image capturing unit, the specific state is an execution state in which the tracking function is performed, and, once the specific state is canceled, a suspension state in which the tracking function is not performed is set.

12. The electronic apparatus according to claim 11, wherein,
while the specific screen is displayed on the second display unit, the control unit designates the tracking target based on a touch position of a touch operation on the display surface.

13. The electronic apparatus according to claim 11, wherein,
while the specific screen is displayed on the second display unit, the control unit performs control,
in response to a touch operation on the display surface, to display an indicator for designating the tracking target to be superimposed on the live view image on the second display unit,
in response to movement of a touch position without releasing a touch of the touch operation, to move a display position of the indicator, and,
in response to a release of the touch of the touch operation, to confirm a subject at the display position of the indicator as the tracking target and to start tracking to set the execution state.

14. The electronic apparatus according to claim 13, wherein the control unit performs control,
while the specific screen is displayed on the second display unit and the execution state is set, in response to a tap operation in which the display surface is touched and the touch is released within a predetermined period of time without movement of a touch position, to cancel the execution state to set the suspension state, and,
while the specific screen is displayed on the second display unit and the execution state is set, in response to a release of a touch of a touch operation different from the tap operation on the display surface, based on a position where the different touch operation has been performed, to confirm a new tracking target and to start tracking to set the execution state.

15. The electronic apparatus according to claim 10, wherein
the specific state is a state in which a specific set item regarding image capturing is set to a set value designated by a user, and
the control unit performs control,
while the specific screen is displayed on the first display unit,
to set the specific set item to a set value based on a touch position of a touch operation on the display surface as the set value designated by the user, and,
if the set value of the specific set item is set to the set value designated by the user, based on whether the touch operation has been performed within the first area on the display surface, to cancel a state in which the set value is set to the set value designated by the user in response to the touch operation within the first area, and,
while the specific screen is displayed on the second display unit,
to set the specific set item to a set value based on a touch position of a touch operation on the display surface as the set value designated by the user, and,
if the set value of the specific set item is set to the set value designated by the user, regardless of whether the touch operation has been performed within the first area on the display surface, to cancel a state in which the set value is set to the set value designated by the user in response to a touch operation at any position within the second area that is larger than the first area.

16. The electronic apparatus according to claim 15, wherein
the control unit performs control,
while the specific screen is displayed on the first display unit and the set value of the specific set item is set to the set value designated by the user, to cancel the state in which the set value is set to the set value designated by the user in response to the touch operation within the first area and to automatically set the set value of the specific set item, and,
while the specific screen is displayed on the second display unit and the set value of the specific set item is set to the set value designated by the user, to cancel the state in which the set value is set to the set value designated by the user in response to the touch operation at any position within the specific area and to automatically set the value of the specific set item.

17. The electronic apparatus according to claim 16, wherein the specific set item is ISO sensitivity.

18. An electronic apparatus comprising:
at least one memory and at least one processor which function as:
a detecting unit configured to detect a touch operation on an operation surface; and
a control unit configured to perform control,
while a specific screen on which an operation for setting a specific function is receivable is displayed on a display unit which is different from the operation surface,
to move an item regarding the specific function in response to a touch moving operation within a specific area on the operation surface and not to move the item when a touch moving operation is performed within a third area which is outside the specific area on the operation surface,
to set a specific state regarding the specific function in response to a releasing of the touch after the touch moving operation within the specific area, and,
after the specific state being set, to cancel the specific state in response to a touch operation not including a moving operation at any position within a second area including the specific area and the third area on the operation surface.

19. The electronic apparatus according to claim 18, wherein the specific area is smaller than an entire area within which a touch operation is detectable by using the detecting unit and is set by a user operation.

20. The electronic apparatus according to claim 18, wherein the second area is an entire area within which a touch operation is detectable by using the detecting unit.

21. The electronic apparatus according to claim 18, wherein
the display unit is an in-viewfinder display unit that is viewable through a look-into-type viewfinder, and
the operation surface is disposed outside the look-into-type viewfinder and is a display surface of a touch panel display unit that is different from the display unit.

22. A method for controlling an electronic apparatus, the method comprising:
detecting a touch operation on a display surface of a first display unit;

switching between display on the first display unit and display on a second display unit; and performing control, to set a specific state regarding a specific function based on the touch operation on the display surface while a specific screen on which an operation for setting the specific function is receivable is displayed on the first display unit or while the specific screen is displayed on the second display unit, and, after the specific state being set, in a case where the specific screen is displayed on the first display unit, to cancel the specific state in response to the touch operation within a first area of the display surface, and, in a case where the specific screen is displayed on the second display unit, to cancel the specific state in response to the touch operation at any position within a second area that is larger than the first area of the display surface.

23. A method for controlling an electronic apparatus, the method comprising:

detecting a touch operation on an operation surface; and performing control, while a specific screen on which an operation for setting a specific function is receivable is displayed on a display unit which is different from the operation surface, to move an item regarding the specific function in response to a touch moving operation within a specific area on the operation surface and not to move the item when a touch moving operation is performed within a third area which is outside the specific area on the operation surface, to set a specific state regarding the specific function in response to a releasing of the touch after the touch moving operation within the specific area, and, after the specific state being set, to cancel the specific state in response to a touch operation at any position within a second area including the specific area and the third area on the operation surface.

24. A non-transitory computer-readable storage medium storing a program for causing a computer to execute a method for controlling an electronic apparatus, the method comprising:

detecting a touch operation on a display surface of a first display unit;

switching between display on the first display unit and display on a second display unit; and performing control, to set a specific state regarding a specific function based on the touch operation on the display surface while a specific screen on which an operation for setting the specific function is receivable is displayed on the first display unit or while the specific screen is displayed on the second display unit, and, after the specific state being set, in a case where the specific screen is displayed on the first display unit, to cancel the specific state in response to the touch operation within a first area of the display surface, and, in a case where the specific screen is displayed on the second display unit, to cancel the specific state in response to the touch operation at any position within a second area that is larger than the first area of the display surface.

25. A non-transitory computer-readable storage medium storing a program for causing a computer to execute a method for controlling an electronic apparatus, the method comprising:

detecting a touch operation on an operation surface; and performing control, while a specific screen on which an operation for setting a specific function is receivable is displayed on a display unit which is different from the operation surface, to move an item regarding the specific function in response to a touch moving operation within a specific area on the operation surface and not to move the item when a touch moving operation is performed within a third area which is outside the specific area on the operation surface, to set a specific state regarding the specific function in response to a releasing of the touch after the touch moving operation within the specific area, and, after the specific state being set, to cancel the specific state in response to a touch operation at any position within a second area including the specific area and the third area on the operation surface.

* * * * *